US012559985B2

(12) United States Patent
Miller et al.

(10) Patent No.: US 12,559,985 B2
(45) Date of Patent: Feb. 24, 2026

(54) ELECTROMECHANICAL LOCKS AND RELATED METHODS

(71) Applicant: LOCK II, LLC, Lexington, KY (US)

(72) Inventors: J. Clayton Miller, Lexington, KY (US); Michael P. Harvey, Laguna Niguel, CA (US)

(73) Assignee: LOCK II, LLC, Nicolasville, KY (US)

( * ) Notice: Subject to any disclaimer, the term of this patent is extended or adjusted under 35 U.S.C. 154(b) by 124 days.

(21) Appl. No.: 18/096,068

(22) Filed: Jan. 12, 2023

(65) Prior Publication Data

US 2023/0141216 A1 May 11, 2023

Related U.S. Application Data

(63) Continuation of application No. PCT/US2021/043470, filed on Jul. 28, 2021.
(Continued)

(51) Int. Cl.
E05B 65/00 (2006.01)
E05B 17/22 (2006.01)
(Continued)

(52) U.S. Cl.
CPC ........ E05B 65/0075 (2013.01); E05B 17/226 (2013.01); E05B 37/00 (2013.01);
(Continued)

(58) Field of Classification Search
CPC .... E05B 65/0075; E05B 17/226; E05B 37/00; E05B 63/00; E05B 2047/0062;
(Continued)

(56) References Cited

U.S. PATENT DOCUMENTS 3,733,861 A    5/1973  Lester
4,745,784 A    5/1988  Gartner
        (Continued)

FOREIGN PATENT DOCUMENTS

CA      2236986 A1 * 11/1998  .......... G07C 9/0094
CN      1815517 A    8/2006
        (Continued)

OTHER PUBLICATIONS

KR200322375 Machine translation PE2E Search (Year: 2024).*
(Continued)

*Primary Examiner* — Steven A Tullia
(74) *Attorney, Agent, or Firm* — Rooney IP, LLC

(57) ABSTRACT

A dial ring assembly for an electromechanical combination lock includes a housing configured to be mounted on an exterior of a securable enclosure, a dial rotatably disposed on the housing, the dial being rotatable about a dial axis for use in connection with entry of a combination, a lever rotatably disposed on the housing, the lever being rotatable about a lever axis, an external generator disposed in the housing, the external generator being configured to generate electrical energy through rotation of an external generator shaft of the external generator, and a gear train disposed in the housing and operatively connecting the dial, the lever, and the external generator shaft such that rotation of the dial rotates the external generator shaft to produce electrical energy and rotation of the lever rotates the external generator shaft to produce electrical energy.

41 Claims, 13 Drawing Sheets

Related U.S. Application Data

(60) Provisional application No. 63/057,362, filed on Jul. 28, 2020.

(51) Int. Cl.

| | |
|---|---|
| *E05B 37/00* | (2006.01) |
| *E05B 63/00* | (2006.01) |
| *E05G 1/04* | (2006.01) |
| *E05G 1/10* | (2006.01) |
| *H02K 7/116* | (2006.01) |
| *H02K 7/18* | (2006.01) |
| *H02S 10/10* | (2014.01) |

(52) U.S. Cl.
CPC ............... *E05B 63/00* (2013.01); *E05G 1/04* (2013.01); *E05G 1/10* (2013.01); *H02K 7/116* (2013.01); *H02K 7/1853* (2013.01); *H02S 10/10* (2014.12)

(58) Field of Classification Search
CPC ............... E05B 49/00; E05B 2047/002; E05B 2047/0022; E05B 2047/0064; E05G 1/04; E05G 1/10; E05Y 2999/00; H02K 7/116; H02K 7/1853; H02S 10/10; G07C 9/00912; G07C 9/0069
USPC ......................................................... 70/332
See application file for complete search history.

(56) References Cited

U.S. PATENT DOCUMENTS

| | | | |
|---|---|---|---|
| 4,899,562 A | | 2/1990 | Gartner et al. |
| 5,061,923 A | | 10/1991 | Miller et al. |
| 5,184,491 A | * | 2/1993 | Schittenhelm .......... E05B 37/08 |
| | | | 70/333 R |
| 5,265,452 A | | 11/1993 | Dawson |
| 5,410,301 A | | 4/1995 | Dawson et al. |
| 5,493,279 A | | 2/1996 | Dawson et al. |
| 5,493,882 A | | 2/1996 | Jasper |
| 5,517,184 A | * | 5/1996 | Miller ................ G07C 9/00912 |
| | | | 340/5.55 |
| 5,604,489 A | | 2/1997 | Hyatt, Jr. |
| 5,613,388 A | * | 3/1997 | Murphree .......... E05B 47/0688 |
| | | | 70/333 R |
| 5,640,862 A | | 6/1997 | Remenicky |
| 5,647,235 A | | 7/1997 | Clark et al. |
| 5,870,914 A | * | 2/1999 | Dawson ............. G07C 9/00912 |
| | | | 340/5.55 |
| 5,896,026 A | | 4/1999 | Higgins |
| 5,914,669 A | | 6/1999 | Wicks et al. |
| 6,076,383 A | | 6/2000 | Clark et al. |
| 6,218,955 B1 | * | 4/2001 | Conklin ................... G07C 9/27 |
| | | | 340/13.24 |
| 6,337,618 B1 | | 1/2002 | Craig et al. |
| 6,494,067 B1 | * | 12/2002 | Jasper ................ G07C 9/00912 |
| | | | 70/333 R |
| 6,741,160 B1 | | 5/2004 | Dawson et al. |
| 7,046,123 B1 | | 5/2006 | Goldberg |
| 7,932,810 B2 | | 4/2011 | Gartner |
| 8,091,392 B2 | | 1/2012 | Miller et al. |
| 8,093,986 B2 | * | 1/2012 | Harvey ................... E05B 37/00 |
| | | | 235/382 |
| 8,516,863 B2 | | 8/2013 | Miller et al. |
| 8,520,377 B2 | * | 8/2013 | Senatori ................ G06F 1/1679 |
| | | | 361/679.55 |
| 8,635,893 B2 | | 1/2014 | Miller et al. |
| 8,638,227 B2 | | 1/2014 | Yuan |
| 8,902,042 B2 | | 12/2014 | Davis et al. |
| 9,080,349 B2 | | 7/2015 | Burrus et al. |
| 9,121,199 B2 | | 9/2015 | Li |
| 9,650,808 B2 | | 5/2017 | Martel et al. |
| 9,816,294 B2 | | 11/2017 | Burrus et al. |
| 9,874,042 B2 | | 1/2018 | Gartner |
| 9,995,060 B2 | | 6/2018 | Miller et al. |
| 10,032,328 B2 | | 7/2018 | Horne et al. |
| 10,128,283 B2 | | 11/2018 | Bryla |
| 10,190,335 B2 | | 1/2019 | DeHaven et al. |
| 10,438,978 B2 | | 10/2019 | Bryla et al. |
| 11,408,205 B2 | * | 8/2022 | Piirainen ............. E05B 47/0012 |
| 11,536,053 B2 | * | 12/2022 | Ashcroft ................. E05B 41/00 |
| 11,661,787 B2 | * | 5/2023 | Moyer ................... G08B 13/08 |
| | | | 109/43 |
| 11,846,121 B2 | * | 12/2023 | Miller .................... E05B 47/026 |
| 2003/0103324 A1 | * | 6/2003 | Gallivan ............... G06F 1/1683 |
| | | | 361/679.27 |
| 2005/0280500 A1 | | 12/2005 | Miller et al. |
| 2010/0180649 A1 | | 7/2010 | Harvey |
| 2014/0109632 A1 | | 4/2014 | Horne et al. |
| 2014/0165678 A1 | | 6/2014 | Burrus |
| 2014/0225375 A1 | | 8/2014 | Chang |
| 2017/0051531 A1 | | 2/2017 | Min et al. |
| 2018/0051481 A1 | | 2/2018 | Miller et al. |
| 2018/0051482 A1 | | 2/2018 | Miller et al. |
| 2018/0283050 A1 | | 10/2018 | Miller et al. |
| 2019/0119949 A1 | | 4/2019 | Roatis et al. |
| 2019/0131818 A1 | | 5/2019 | Bryla et al. |
| 2019/0169879 A1 | | 6/2019 | Miller |
| 2020/0095802 A1 | | 3/2020 | Miller et al. |
| 2020/0095803 A1 | | 3/2020 | Miller et al. |
| 2020/0141157 A1 | | 5/2020 | Miller et al. |
| 2020/0318393 A1 | | 10/2020 | Miller |
| 2021/0388641 A1 | * | 12/2021 | Ashcroft ............... E05B 13/004 |

FOREIGN PATENT DOCUMENTS

| | | | | |
|---|---|---|---|---|
| CN | 102071838 A | | 5/2011 | |
| CN | 103732844 A | | 4/2014 | |
| DE | 3208818 A1 | | 9/1983 | |
| EP | 0552115 A1 | * | 7/1993 | ......... E05B 17/2084 |
| EP | 0712983 A2 | * | 5/1996 | ............. E05B 49/00 |
| EP | 0807732 A2 | * | 11/1997 | .......... G07C 9/0030 |
| EP | 1818874 A1 | | 8/2007 | |
| EP | 2998490 A1 | * | 3/2016 | .......... E05B 1/0084 |
| GB | 2423201 A | * | 8/2006 | ............. F21L 13/06 |
| GB | 2495848 A | | 4/2013 | |
| KR | 20040093937 A | * | 11/2004 | ............. E05B 47/00 |
| KR | 20060092498 A | * | 8/2006 | .......... E05D 11/107 |
| KR | 100690629 B1 | * | 3/2007 | .......... H04M 1/0212 |
| WO | WO-9929987 A1 | * | 6/1999 | ........ G07C 9/00698 |
| WO | WO-0023679 A2 | * | 4/2000 | ........ G07C 9/00666 |
| WO | 2018222817 A1 | | 12/2018 | |
| WO | 2022026556 A1 | | 2/2022 | |

OTHER PUBLICATIONS

U.S. Patent and Trademark Office, International Preliminary Report on Patentability in PCT Application No. PCT/US2022/053327, Apr. 8, 2024.

U.S. Patent and Trademark Office, International Preliminary Report on Patentability in PCT Application No. PCT/US2021/043470, Feb. 9, 2023.

U.S. Patent and Trademark Office, International Search Report and Written Opinion in PCT Application No. PCT/US2021/043470, Dec. 20, 2021.

KABA MAS, Operating Instructions, X-10, Type 1F High Security Electronic Lock, Document No. 539.0512, 2002-2018.

KABA MAS, Operating Instructions, X-10, Type 1F High Security Electronic Lock, Document No. 519.0112, 2002-2013.

Federal Specification, Locks, Combination, Electromechanical, FF-L-2740B, Jun. 15, 2011, Superceding FF-L-2740A, Jan. 1997.

European Patent Office, Supplementary European Search Report in EP Application No. 21850794.5, Jul. 30, 2024.

U.S. Patent and Trademark Office, International Search Report and Written Opinion in PCT Application No. PCT/US22/53327, May 12, 2023.

(56)          References Cited

OTHER PUBLICATIONS

U.S. Patent and Trademark Office, Office Action in U.S. Appl. No.
18/668,410, Dec. 26, 2024.

* cited by examiner

400

404

410

402

414

406

412

408

ELECTROMECHANICAL LOCKS AND RELATED METHODS

CROSS REFERENCE TO RELATED APPLICATION

This application is a continuation of PCT Application Serial No. PCT/US2021/043470, filed Jul. 28, 2021 which claims the priority of U.S. Provisional Patent Application Ser. No. 63/057,362 filed on Jul. 28, 2020, the disclosures of which are incorporated herein by reference in their entirety.

TECHNICAL FIELD

Embodiments relate generally to locks, and, more specifically, to high-security electromechanical combination locks for use in connection with safes and other secured containers, enclosures, and any other security components. Embodiments also relate to methods involving such locks.

BACKGROUND

Enclosures, which may be rooms, safes, cabinets and the like, are used to securely store highly valuable and highly sensitive items. In some circumstances, it may be advisable to utilize high-security locks, such as high-security electromechanical combination locks, on such securable enclosures. Typically, for example, a high-security electromechanical lock would be used on a door or other access component of the enclosure. Some high-security electromechanical combination locks may be configured for operation independent of externally supplied electrical power.

Some known high-security electromechanical locks relying primarily on batteries as a source of electrical power may require frequent battery replacement. High-security electromechanical locks may utilize integral, self-generating electrical power sources, such as electrical generators driven by rotation of a combination dial. Self-generating locks may require substantial angular rotation of the combination dial to generate sufficient electrical power. For example, this may be well beyond the rotation necessary to enter the combination.

It would be desirable to provide additional advancements related to high-security electromechanical combination locks, particularly for such locks that include electrical generators.

SUMMARY

Generally, a dial ring assembly for an electromechanical combination lock is provided and includes a housing configured to be mounted on an exterior of a securable enclosure, a dial rotatably disposed on the housing, the dial being rotatable about a dial axis for use in connection with entry of a combination, a lever rotatably disposed on the housing, the lever being rotatable about a lever axis, an external generator disposed in the housing, the external generator being configured to generate electrical energy through rotation of an external generator shaft of the external generator, and a gear train disposed in the housing and operatively connecting the dial, the lever, and the external generator shaft. Rotation of the dial may rotate the external generator shaft to produce electrical energy. Rotation of the lever may rotate the external generator shaft to produce electrical energy. Rotation of the lever may rotate the dial and the external generator shaft.

In some embodiments the gear train may comprise a dial drive gear operatively connected to the dial for rotation with the dial, and an external generator shaft driven gear operatively connected to the external generator shaft for rotation with the external generator shaft. The gear train may comprise a first intermediate gear coupled to rotate coaxially with a second intermediate gear, the first intermediate gear engaging the dial drive gear and the second intermediate gear engaging the external generator shaft driven gear.

In alternative or additional aspects, the gear train may comprise a lever drive gear operatively connected to the lever for rotation with the lever, and a lever driven gear operatively connected to the dial drive gear for rotation with the dial drive gear. The gear train may comprise a lever idler gear interposing the lever drive gear and the lever driven gear. The lever drive gear may include an internal gear segment. The lever may be rotatable about the lever axis between a first angular position, a second angular position, and a third angular position. In the first angular position, the lever drive gear may be disengaged from the dial drive gear. In the second angular position, the third angular position, and between the second angular position and the third angular position, the lever drive gear may be operatively connected to the dial drive gear such that rotation of the lever between the second angular position and the third angular position rotates the external generator shaft. In some embodiments, rotation of the lever between the first angular position and the second angular position may not rotate the external generator shaft. The gear train may comprise a lever idler gear operatively interposing the lever drive gear and the lever driven gear and in the first angular position, the internal gear segment of the lever drive gear may be angularly separated from the lever idler gear such that the lever drive gear is disengaged from the dial drive gear.

In some embodiments, the dial ring assembly may further comprise a rotatable spindle configured to be operatively connected to a lock assembly mounted on an interior of the securable enclosure and the spindle may be coupled to the lever for rotation with the lever. The spindle may be positioned coaxially with the lever axis and may be rotatable about the lever axis. Rotation of the lever and the spindle may be selectively operative to extend and retract a bolt and when the bolt is in an extended position, the securable enclosure is in a secured condition. The lever may be movable between a first position in which the bolt is extended and a second position in which the bolt is retracted, and the position of the lever may be visually indicative of the status of the securable enclosure being secured or unsecured.

In alternative or additional aspects, the dial ring assembly may further comprise an electronic display disposed on the housing, the electronic display may be configured to display at least one indicium associated with entry of the combination. The display may include audible or other perceptible indicum associated with entry of the combination. The display may be substantially planar. The display may be oriented substantially transversely to the dial axis. The display may be oriented substantially parallel to the dial axis. The display may be repositionable between at least two angular display orientations relative to the dial axis.

In some embodiments, the dial ring assembly may include at least one of a transmitter and a receiver configured for communication with a remote station. The at least one of the transmitter and the receiver may be configured to communicate wirelessly with a communication unit. The communication unit may be operatively connected to the remote station. The transmitter may comprise an infrared transmitter and the receiver may comprise an infrared receiver. The transmitter may be configured to transmit data associated with at least one of a locking event, an unlocking event, and a status report.

In alternative or additional aspects, the dial ring assembly may further comprise a photovoltaic array configured to produce electrical energy. The photovoltaic array may be disposed at least partially circumferentially on the housing. The photovoltaic array may be disposed at least partially circumferentially around the dial.

In alternative embodiments, the dial may be axially displaceable along the dial axis. The dial may be biased axially outward. The dial may be configured such that pressing the dial axially inward actuates at least one switch. In some embodiments, the dial ring assembly may further comprise a switch disposed on the housing.

In some embodiments, the dial ring assembly may further comprise an external processor disposed in the housing. The external processor may be configured to monitor rotation of the dial. The external processor may be configured to communicate with an internal processor disposed within an interior of the securable enclosure. The external processor may be configured to communicate with the internal processor using encrypted infrared data.

In some embodiments, an electromechanical combination lock, may comprise the dial ring assembly and a lock assembly comprising a bolt, the bolt being selectively extendable and retractable. A securable enclosure may comprise a plurality of walls at least partially defining an interior, an access component arranged to selectively close an opening though the plurality of walls, and the electromechanical combination lock disposed on one of the door or one of the plurality of walls. The electromechanical combination lock may be configured to secure the door in a closed position.

Generally, a method of manufacturing a security device is provided, the method comprising assembling a dial ring assembly, comprising providing a housing configured to be mounted on an exterior of a securable enclosure, disposing an external generator in the housing, the external generator being configured to generate electrical energy through rotation of an external generator shaft of the external generator, rotatably disposing a dial on the housing, the dial being rotatable around a dial axis, rotatably disposing a lever on the housing, the lever being rotatable about a lever axis, and disposing a gear train in the housing, the gear train operatively connecting the dial, the lever, and the external generator shaft such that rotation of the dial rotates the external generator shaft to produce electrical energy and rotation of the lever rotates the external generator shaft to produce electrical energy, the dial being rotatable for use in connection with entry of a combination.

The method of manufacture may further comprise disposing an electronic display on the housing, the electronic display being configured to display at least one indicium associated with entry of a combination. The method may further comprise disposing a photovoltaic array on the dial ring assembly. Disposing the photovoltaic array on the dial ring assembly may comprise disposing the photovoltaic array at least partially circumferentially around the housing. Disposing the photovoltaic array on the dial ring assembly may comprise disposing the photovoltaic array at least partially circumferentially around the dial. The method may further comprise installing the dial ring assembly on an exterior of one of a wall and a door of a securable enclosure and installing a lock assembly on an interior of the one of the wall and the door, including operatively connecting the dial ring assembly and the lock assembly through the one of the wall and the door. The method of manufacture may further comprise installing a photovoltaic array on the securable enclosure, including operatively connecting the photovoltaic array to the dial ring assembly, the photovoltaic array comprising a photovoltaic panel.

A method of operating an electromechanical combination lock is provided, the method may comprise entering a combination by rotating a dial disposed on a dial ring assembly about a dial axis. Rotating the dial may produce electrical energy by rotating an external generator shaft of an external generator disposed in a housing of the dial ring assembly. Retracting a bolt extending from a lock assembly may be accomplished by rotating a lever disposed on the dial ring assembly about a lever axis, the lock assembly being operatively connected to the dial ring assembly and rotating the lever may produce electrical energy by rotating the external generator shaft. Entering the combination may include viewing at least one indicium associated with the combination on an electronic display disposed on the housing. Entering the combination may comprise axially displacing the dial along the dial axis in a single press to actuate at least one switch. Entering the combination may comprise axially displacing the dial along the dial axis in a double press to change between at least two modes. Alternatively, entering the combination may comprise actuating a switch located on the housing to change between at least two modes. Entering the combination may comprise viewing one of a random alphabetic character, a random numeric character, and a random symbol, and selecting one of an alphabetic mode, a numeric mode, and a symbol mode, and entering a combination element. The electronic display may display at least one indicium associated with entry of the combination. The display may present audible or other perceptible indicum associated with entry of the combination. Retracting the bolt may comprise rotating the lever in a first direction. The method may further comprise extending the bolt by rotating the lever in a second direction, the second direction being opposite of the first direction.

In some embodiments, a dial ring assembly for an electromechanical combination lock may comprise a housing configured to be mounted on an exterior of a securable enclosure, a dial rotatably disposed on the housing, the dial being rotatable about a dial axis for use in connection with entry of a combination, and an electronic display disposed on the housing, the electronic display being configured to display at least one indicium associated with entry of the combination. The display may be repositionable between at least two angular display orientations relative to the dial axis. The display may be pivotable between the at least two angular display orientations. The at least two angular display orientations may be discrete, fixed angular display orientations and the display may be selectively installable in each of the at least two discrete, fixed angular display orientations. The at least two angular display orientations may comprise a first angular display orientation substantially transverse to the dial axis and a second angular display orientation substantially parallel to the dial axis. The dial ring assembly may further comprise a lever rotatably disposed on the housing, the lever being rotatable about a lever axis, an external generator disposed in the housing, the external generator being configured to generate electrical energy through rotation of an external generator shaft of the external generator, and a gear train operatively connecting the dial, the lever, and the external generator shaft such that rotation of the dial rotates the external generator shaft to produce electrical energy and rotation of the lever rotates the external generator shaft to produce electrical energy. The lever may be rotatable about the lever axis between a first angular position, a second angular position, and a third angular position. In the first angular position, the lever may be disengaged from the external generator shaft. In the second angular position, in the third angular position, and between the second angular position and the third angular position, the lever may be operatively connected to the external generator shaft such that rotation of the lever between the second angular position and the third angular position rotates the external generator shaft. The electromechanical combination lock may further comprise a lock assembly comprising a bolt, the bolt being selectively extendable and retractable.

A securable enclosure may comprise a plurality of walls at least partially defining an interior, a door arranged to selectively close an opening though the plurality of walls, and an electromechanical combination lock disposed on one of the door and one of the plurality of walls. The electromechanical combination lock may be configured to secure the door in a closed position.

A method of reconfiguring an electromechanical combination lock is provided, the method comprising repositioning an electronic display of a dial ring assembly of an electromechanical lock from a first angular display orientation to a different, second angular display orientation relative to a dial axis, the dial ring assembly comprising a housing configured to be mounted on an exterior of a securable enclosure, the dial ring assembly including a dial disposed on the housing, the dial being rotatable about the dial axis for use in connection with entry of a combination, the display being configured to display at least one indicium associated with entry of the combination. Repositioning the electronic display may include pivoting the display from the first angular display orientation to the second angular display orientation. Repositioning the electronic display may comprise pivoting the display from the first angular display orientation to the second angular display orientation while the electromechanical lock is mounted on the securable enclosure. Each of the first angular display orientation and the second angular display orientation may be a discrete, fixed angular display orientation. The display may be selectively installable in each of the first angular display orientation and the second angular display orientation. Repositioning the electronic display may comprise removing the display from the first angular display orientation and installing the display in the second angular display orientation. Each of the first angular display orientation and the second angular display orientation may be one of substantially transverse to the dial axis and substantially parallel to the dial axis.

A method of installing an electromechanical combination lock on a securable enclosure may comprise mounting a dial ring assembly on an exterior of one of a wall and a door of a securable enclosure, the dial ring assembly comprising a housing, a dial rotatably disposed on the housing, the dial being rotatable about a dial axis for use in connection with entry of a combination, a lever rotatably disposed on the housing, the lever being rotatable about a lever axis, an external generator disposed in the housing, the external generator being configured to generate electrical energy through rotation of an external generator shaft of the external generator, and a gear train operatively connecting the dial, the lever, and the external generator shaft such that rotation of the dial rotates the external generator shaft to produce electrical energy and rotation of the lever rotates the external generator shaft to produce electrical energy. The method may further comprise mounting a lock assembly on an interior of one of the wall and the door, including operatively connecting the dial ring assembly and the lock assembly through one of the wall and the door. Operatively connecting the dial ring assembly and the lock assembly may comprise connecting a rotatable spindle to the dial ring assembly and the lock assembly. Operatively connecting the dial ring assembly and the lock assembly may include installing a power tube comprising at least one conductor electrically connecting the dial ring assembly and the lock assembly. The method may further comprise installing a photovoltaic array on the securable enclosure, including operatively connecting the photovoltaic array to the dial ring assembly, the photovoltaic array comprising a photovoltaic panel.

Additional aspects and advantages of the invention will become more apparent upon further review of the detailed description of the illustrative embodiments taken in conjunction with the accompanying drawings.

DETAILED DESCRIPTION

Illustrative embodiments according to at least some aspects of the present disclosure are described and illustrated below and include devices and methods relating to security devices including locks, such as electromechanical combination locks, and securable enclosures utilizing such locks. It will be apparent to those of ordinary skill in the art that the embodiments discussed below are illustrative examples and may be reconfigured without departing from the scope and spirit of the present disclosure. It is also to be understood that variations of the exemplary embodiments contemplated by one of ordinary skill in the art shall concurrently comprise part of the instant disclosure. The illustrative embodiments as discussed below may include optional steps, methods, and features that one of ordinary skill should recognize as not being a requisite to fall within the scope of the present disclosure.

The present disclosure includes, inter alia, security devices including high-security electromechanical combination locks for use on securable enclosures, and related methods. Some illustrative embodiments according to at least some aspects of the present disclosure relate to security devices, including securable enclosures such as safes, filing cabinets, security containers, vaults, secure rooms, and the like.

Figure 1:
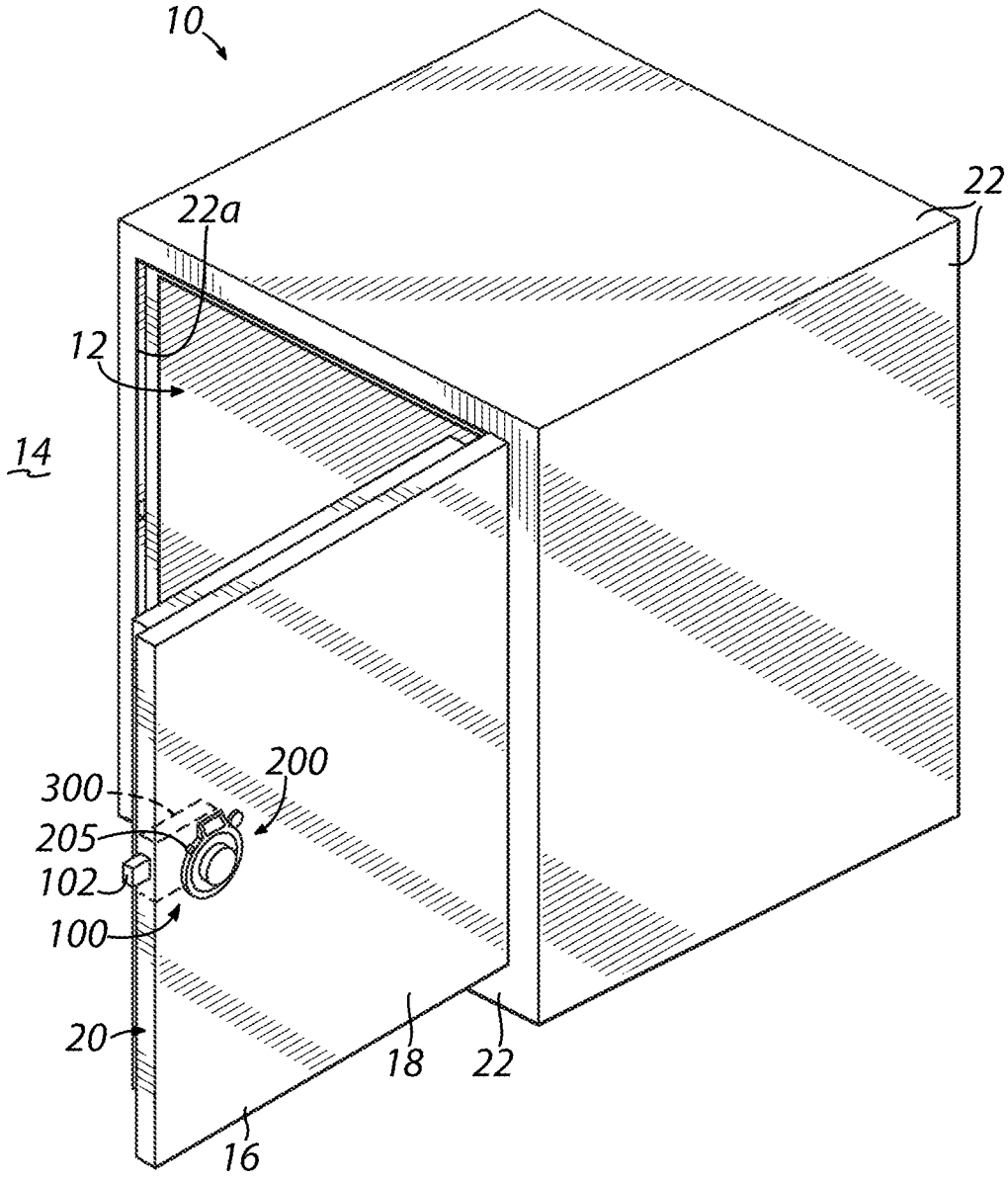
FIG. 1 is an isometric view of an illustrative securable enclosure including an illustrative electromechanical combination lock.

FIG. 1 is an isometric view of an illustrative securable enclosure 10 including an illustrative electromechanical combination lock 100, according to at least some aspects of the present disclosure. The illustrative securable enclosure 10 is generally in the form of a safe configured to securely contain highly valuable and/or highly sensitive articles therein and includes an interior 12, which is at least partially defined by a plurality of walls 22. The interior 12 of the enclosure 10 is selectively accessible from an exterior 14 of the enclosure 10, such as via a repositionable (e.g., hinged) door 16 operatively arranged to selectively close an opening 22a in the walls 22.

In this illustrative embodiment, the lock 100 is mounted to the door 16 and includes a selectively extendable and retractable bolt 102, which is configured to secure the door 16 in a closed position. The illustrative lock 100 includes a dial ring assembly 200 disposed on the exterior 18 of the door 16 and a lock assembly 300 disposed on the interior 20 of the door 16. Generally, the lock assembly 300 may include various structures and features, such as the bolt 102, as may be necessary to perform the functions of the lock assembly 300 as described herein.

In alternative embodiments, the securable enclosure 10 may be in the form of another type of security device or container (e.g., a filing cabinet) or may be in the form of a larger secure area, such as a vault or a secure room. In some embodiments, the lock 100 may be mounted on the securable enclosure 10 (e.g., on a wall 22) proximate the door 16, rather than on the door 16. In some embodiments, the bolt 102 of the lock 100 may act directly to secure the door 16 in the closed position, or the bolt 102 may act in connection with a mechanism, such as boltworks, to secure the door 16 in the closed position.

Figure 2:
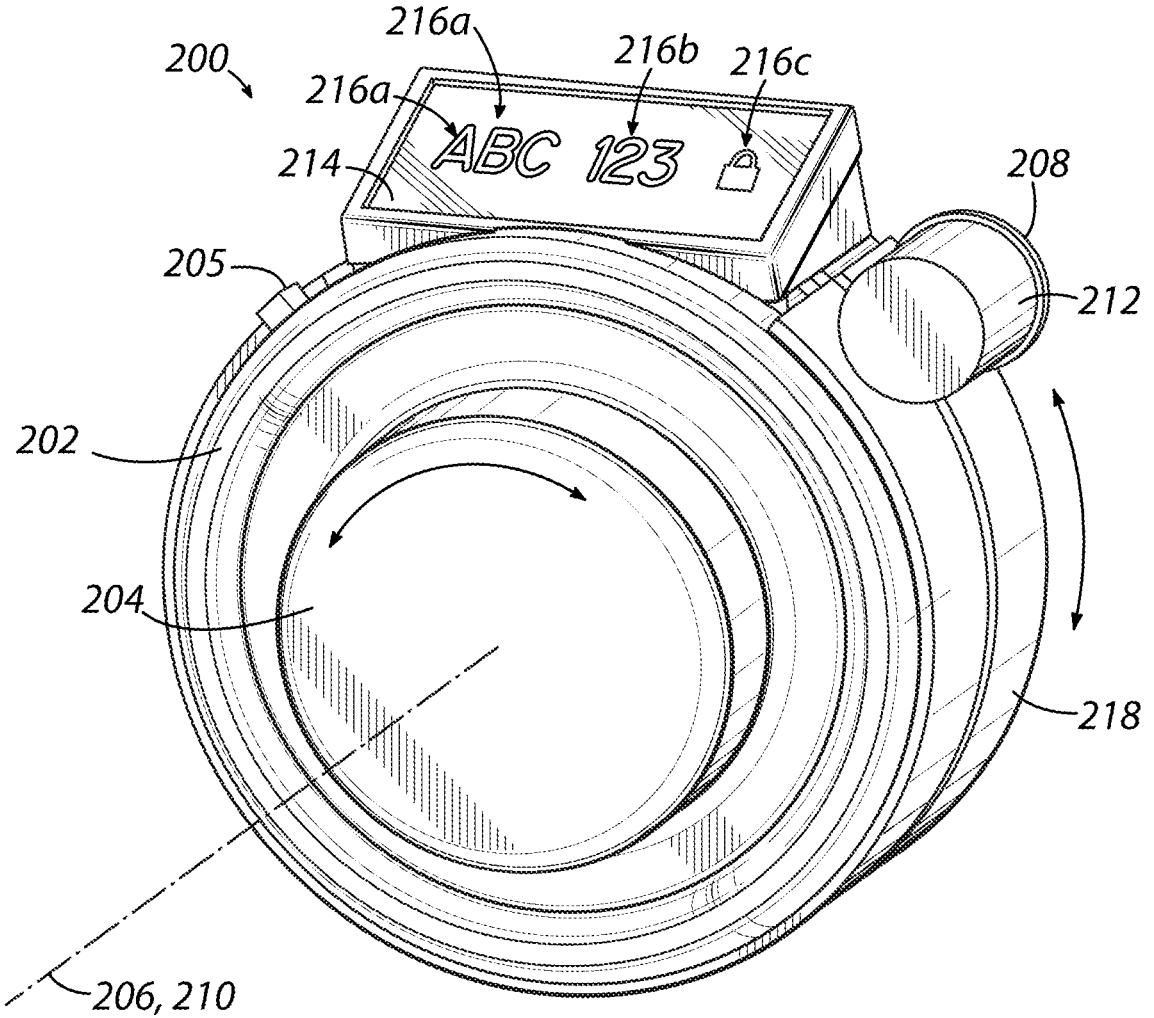
FIG. 2 is an isometric view of an illustrative dial ring assembly.
Figure 3:
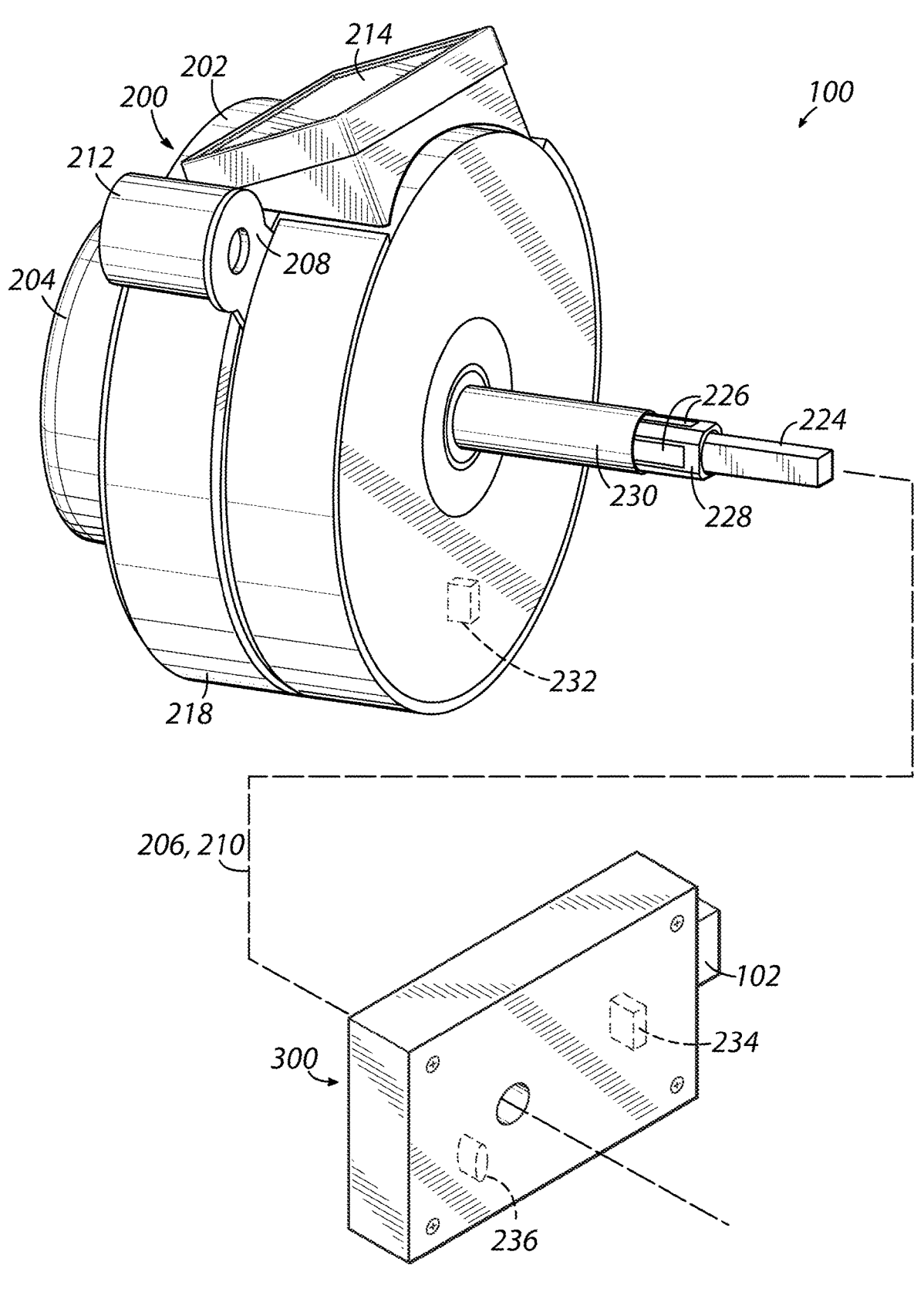
FIG. 3 is a rear isometric exploded view of an illustrative electromechanical combination lock.
Figure 4:
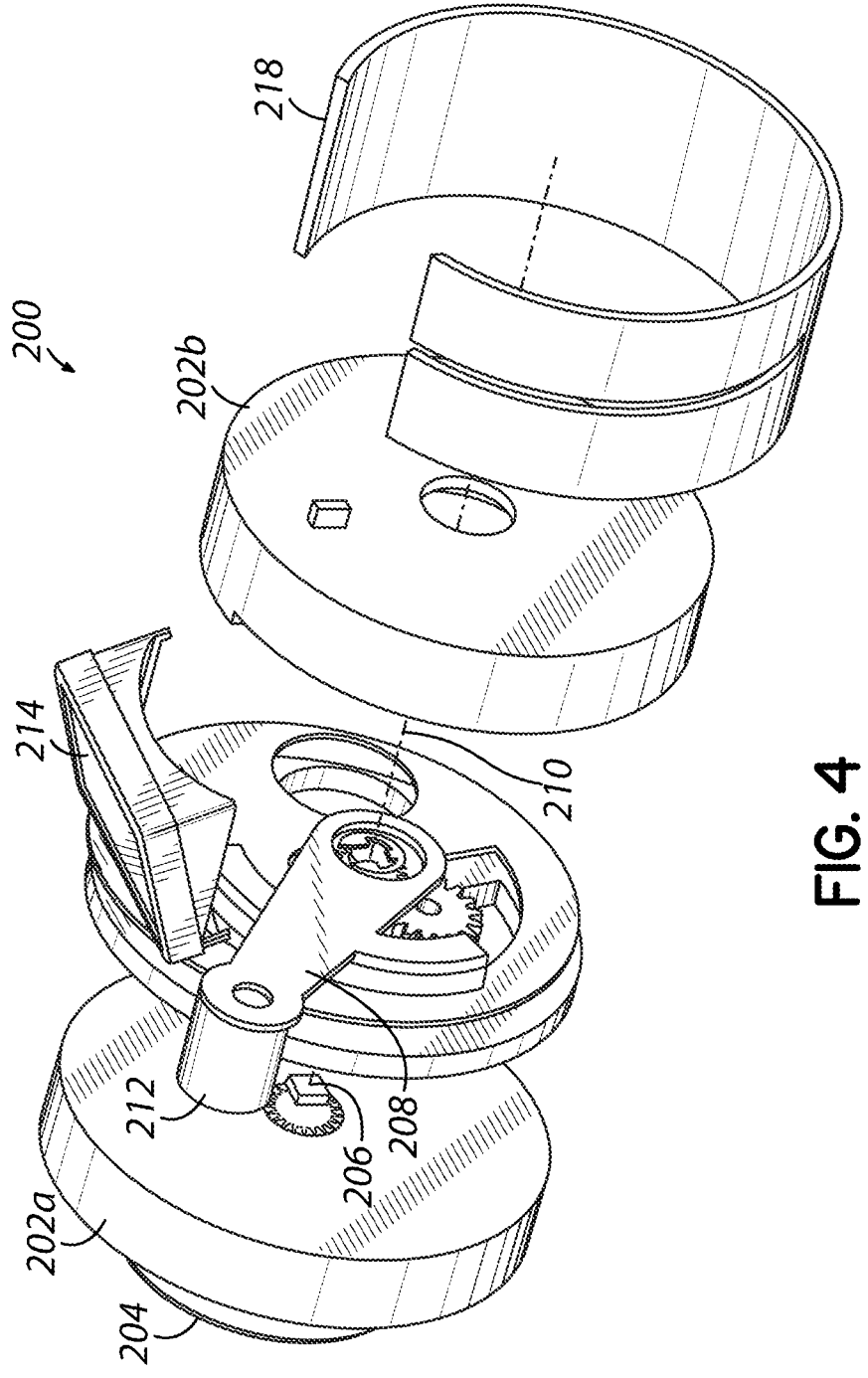
FIG. 4 is an exploded, rear isometric view of the dial ring assembly of FIG. 2.

FIG. 2 is an isometric view of the illustrative dial ring assembly 200, FIG. 3 is a rear isometric exploded view of the illustrative lock 100, and FIG. 4 is an exploded, rear isometric view of the illustrative dial ring assembly 200, all according to at least some aspects of the present disclosure.

Referring to FIGS. 1-4, the illustrative dial ring assembly 200 includes a housing 202 configured to be mounted on the exterior 18 of the enclosure 10. A combination entry component, such as a rotatable dial 204, is rotatably disposed on the housing 202. The dial 204 is rotatable about a dial axis 206, such as for use in connection with the entry of a combination by a user. In some embodiments, the dial 204 may be easily rotatable by a user's finger tips to facilitate ease of dialing. For example, the dial torque may be about 16 to 20 inch-ounces (0.113 to 0.141 N-m). The dial axis 206 may be generally perpendicular to the generally flat exterior 18 of the enclosure 10. The housing 202 may comprise a first, outer portion 202a receiving the dial 204 and a second, inner portion 202b, which is disposed against the exterior 18 of the enclosure 10.

In this illustrative embodiment, a switch 205 is mounted to the housing 202 and oriented that such that the switch 205 may be operated by a user's thumb and/or finger in conjunction with the user operating the dial 204, for example. The switch 205 may be a push button, for example. The switch 205 may be radially displaceable inward toward the center of the dial 204. The switch 205 may be biased radially outward away from the center of the dial 204. Pressing the switch 205 radially inward toward the center of the dial 204 may actuate the switch 205 and be operative to enter an element of a combination, toggle between modes (e.g., between alphabetic characters, numeric characters, and/or any other symbols or characters of any type), and/or otherwise facilitate communication between the user and the lock 100. For example, a single press of the switch 205 may be used to enter an input (e.g., a selected element of a combination or a selection from a menu) and/or a double press may be used to change modes as described further below, for example, in connection with changing the type of character being input (e.g., alphabetic, numeric, symbol, etc.).

Figure 5:
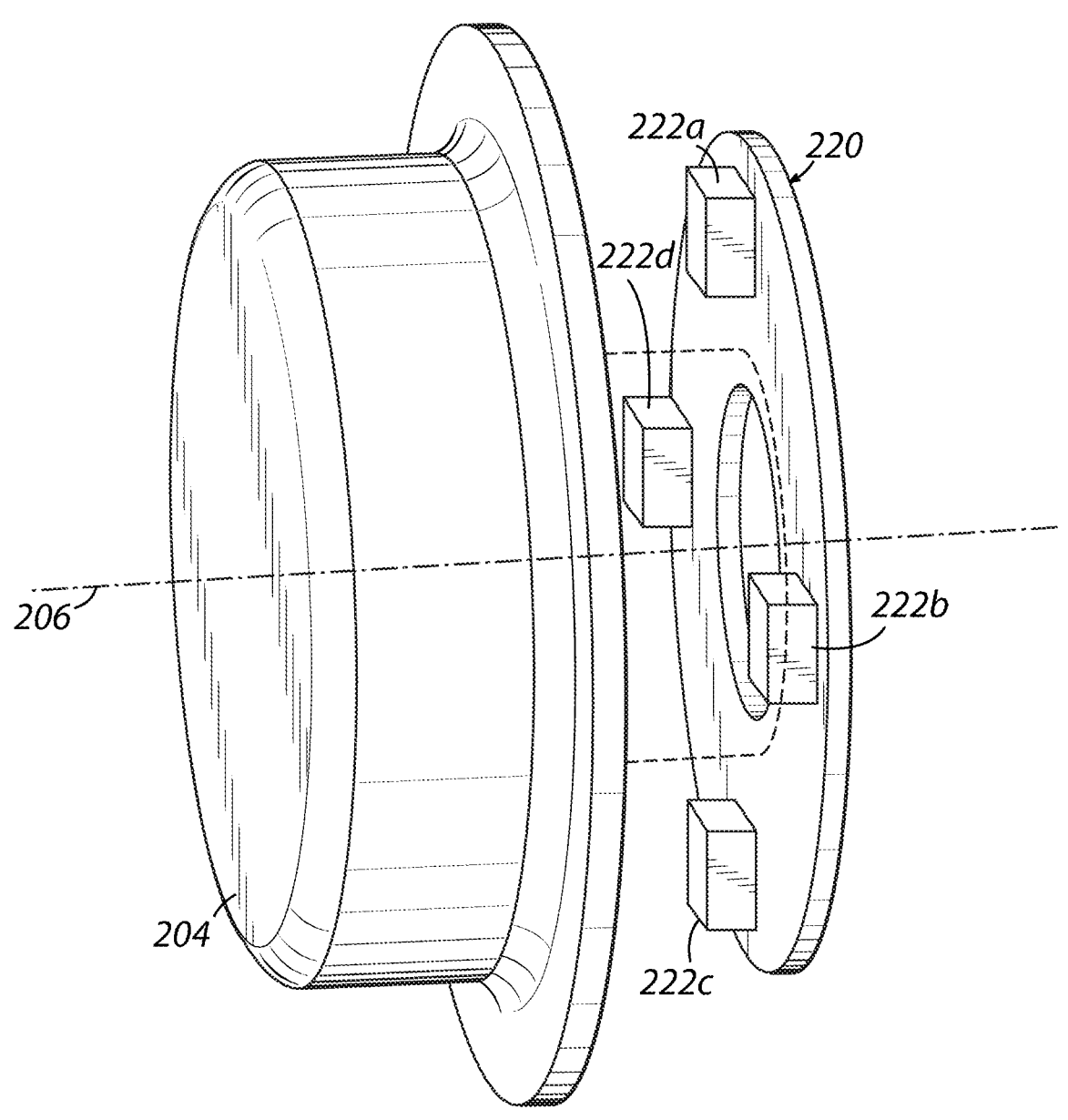
FIG. 5 is an exploded isometric view of the dial of FIG. 2 and an illustrative dial switch assembly.

FIG. 5 is an exploded isometric view of the dial 204 and an illustrative dial switch assembly 220, according to at least some aspects of the present disclosure. Referring to FIGS. 1-5, in the illustrative dial ring assembly 200, the dial 204 is mounted to the housing 202 such that the dial 204 is axially displaceable (e.g., along the dial axis 206) inward toward the housing 202. The dial 204 may be biased (e.g., by a spring or wave washer, or by magnets arranged to repel one another) axially outward away from the enclosure 10. Pressing the dial 204 axially inward in the direction of the enclosure 10 may actuate one or more switches 222a, 222b, 222c, 222d disposed on the dial switch assembly 220. Actuation of the one or more switches 222a, 222b, 222c, 222d may be operative to enter an element of a combination, toggle between modes (e.g., between alphabetic characters, numeric characters, symbols and/or characters of any type), and/or otherwise facilitate communication between the user and the lock 100. For example, a single press of the dial 204 may be used to enter an input (e.g., a selected element of a combination or a selection from a menu) and/or a double press may be used to change modes.

Referring again to FIGS. 1-4, the illustrative dial ring assembly 200 includes a lever 208 that is rotatably disposed on the housing 202. The lever 208 is rotatable about a lever axis 210, which may be substantially parallel to, such as coaxial with, the dial axis 206. The lever 208 may include one or more features configured to be grasped by a user, such as a knob 212. As described below, the lever 208 is rotatable to generate electrical power and/or, selectively, to retract and/or extend the bolt 102.

The illustrative dial ring assembly 200 includes a display, such as an electronic display 214, disposed on the housing 200 for viewing by a user. In some example embodiments, the electronic display may comprise a dot matrix display. The display 214 may comprise an organic light-emitting diode ("OLED") display and/or an E Ink ("electronic ink") display, for example. The electronic display 214 is configured to display one or more indicia 216 associated with operation of the lock 100, such as one or more alphabetic characters 216a, one or more numeric characters 216b, and/or one or more symbols 216c. The indicia 216 may be used in connection with entering a combination and/or changing a combination, for example. The display 214 is substantially planar and is oriented substantially transversely to the dial axis 206 (e.g., at about 45 degrees). As used herein, "transverse" may refer to relative angular orientations that are non-parallel (e.g., perpendicular or oblique). In alternative embodiments, the display 214 may be mounted in other orientations or positions.

Alternative embodiments may include a display 214 that is repositionable between at least two angular display orientations with respect to the dial axis 206. For example, the display 214 may be pivotable between at least two angular display orientations. In other exemplary embodiments, the display 214 may be selectively installable in each of at least two discrete, fixed angular display orientations. The at least two angular display orientations may include a first angular display orientation substantially transverse to the dial axis and a second angular display orientation substantially parallel to the dial axis.

Illustrative methods involving repositioning displays, such as methods of reconfiguring a lock 100, are described. A method may include repositioning the display 214 from a first angular display orientation to a different, second angular display orientation. For example, repositioning the display 214 may include pivoting the display 214, such as while the lock 100 is mounted on a securable enclosure 10. Where the angular display orientations are discrete, fixed orientations, the method may include removing the display 214 from the first angular display orientation and installing the display 214 in the second angular display orientation.

The illustrative dial ring assembly 200 includes a dial ring photovoltaic array 218 disposed circumferentially on the exterior of the housing 200. The dial ring photovoltaic array 218 produces electrical energy for the lock 100 using light incident on the lock 100.

Referring to FIGS. 1-3, the lock 100 may include one or more connections, such as mechanical connections, electrical connections, data connections, etc., between the exterior dial ring assembly 200 and the internal lock assembly 300, such as through the door 16 or wall 22 of the enclosure 10. The illustrative lock 100 includes a rotatable spindle 224, which is configured to extend from the dial ring assembly 200 to the lock assembly 300. The lever 208 is mechanically coupled to the spindle 224 such that rotating the lever 208 rotates the spindle 224. In this illustrative embodiment, the spindle 224 is positioned coaxially with the lever axis 210 and is rotatable about the lever axis 210. The lock assembly 300 is configured so that, under certain conditions, rotation of the spindle 224 by the lever 208 is operative to retract and/or extend the bolt 102 of the lock assembly 300, as described below.

Referring to FIGS. 1 and 3, in this illustrative embodiment, one or more electrical conductors 226 extend between the dial ring assembly 200 and the lock assembly 300. The conductors 226 are disposed on the radially outer surface of a generally cylindrical power tube 228. The power tube 228 is substantially hollow and receives the rotatable spindle 224 therethrough. The power tube 228 may be housed radially within an outer tube 230. Any other suitable manner of conducting electrical power and/or signals may be used instead of, or in addition to, the power tube 228.

The illustrative dial ring assembly 200 includes an external processor 232 disposed in the housing 202, which is configured to communicate with an internal processor 234 disposed within the interior of the enclosure 10, such as in the lock assembly 300. For example, the external processor 232 and the internal processor 234 may be configured for encrypted infrared data transfer therebetween, such as through the outer tube 230. In some exemplary embodiments, the processors 232, 234 may be synchronized and/or may be matched at the time of manufacture, for example by matching serial numbers.

The external processor 232 is configured to perform various functions associated with operation of the lock 100. For example, the external processor 232 may monitor rotation of the dial 204, such as directional information from sensors associated with the dial 204 to increment and/or decrement the display electronics. The external processor 232 may control and/or update the information shown on the display 214. The external processor 232 may control the internal processor 234, such as via a two-wire tube system and/or an infrared communication system. The external processor 232 may transmit the user dial inputs to the internal processor 234, which may subsequently detect the combination entry. The external processor 232 may shut down the power to the internal processor 234 and/or the external processor 232, and/or may signal to shut down the internal power. The external processor 232 may coordinate, such as through the display 214, combination entry and/or storage for the internal processor 234. The external processor 232 may control the display of pertinent lock status (e.g., locked and/or unlocked) on the display 214. The external processor 232 may compute and/or display random initial characters on the display 214 during combination entry. The external processor 232 may impose dialing delays when excessive combination entries have been attempted. The external processor 232 may accept information from the internal processor 234, such as information indicating that the correct combination was entered. The external processor 232 may maintain pertinent information for encrypting and display for the supervisor coordinator. The external processor 232 may store audit trail information, such as time of entry tries, user opening tries, etc. Other electronics in the dial ring assembly 200 may also perform various functions associated with operation of the lock 100. For example, some electronics may rectify the phase signals from an electrical power generator (e.g., a three-phase generator). Some electronics may detect operation of various components (e.g., a lever) and/or the position of such components. Some electronics may sense additional operation of various components (e.g., a lever). Some electronics may facilitate transmission and/or receipt of information, such as via infrared or RF communication. Some electronics may sense the rotational direction and/or position of the dial 204 and/or other components (e.g., a generator). Some electronics may perform connecting and/or clamping functions for various signals, such as photovoltaic cell power lines. Some electronic components may house various components, such as photovoltaic cells, a real-time clock, a battery for a real-time clock, and/or display electronics. Some electronics may monitor and/or control start-up power conditions.

The internal processor 234 is configured to perform various functions associated with operation of the lock 100. For example, the internal processor 234 may accept combination entries from the external processor 232. The internal processor 234 may maintain the opening combinations. The internal processor 234 may compare the combination entered to a desired combination. The internal processor 234 may activate motor drive electronics if a correct combination is entered. The internal processor 234 may communicate to external electronics that the entered combination is correct, or has failed. The internal processor 234 may output audit trail information to a supervisor (e.g., with the securable container open). The internal processor 234 may input biometric or card information to enable lock operation (this may also be implemented from the dial ring). Generally, the internal processor 234 may operate as a secondary element in a primary/secondary relationship with the external processor 232. Other electronics in the lock assembly 300 may also perform various other functions associated with operation of the lock 100. Some electronics may facilitate communication between the internal processor 234 and the external processor 232. Some electronics may comprise motor drive electronics configured to facilitate operation of a motor arranged to engage the mechanism to retract and/or extend the bolt 102. Some electronics may facilitate start up and/or shut down of various other electronics. Some electronics may be associated with electrical power storage (e.g., capacitors) providing electrical power for various other components. Some electronics may facilitate combination entry and/or audit trail detection initiation and/or communication.

In some exemplary embodiments, the lock assembly 300 may include an internal electrical generator 236. The internal electrical generator 236 may be configured for rotation by the spindle 224 so that the internal electrical generator 236 produces electrical energy when the lever 208 is rotated. Some exemplary embodiments including both an internal electrical generator 236 and an external electrical generator 404 (described below with reference to FIGS. 6-8) may not require electrical conductors configured to conduct electrical power between the dial ring assembly 200 and the lock assembly 300 as each assembly 200, 300 comprises a respective generator 236, 404. Exemplary embodiments including an internal electrical generator 236 and an external electrical generator 404 may include electrical power storage devices (e.g., power storage capacitors) in both the dial ring assembly 200 and the lock assembly 300.

Figure 6:
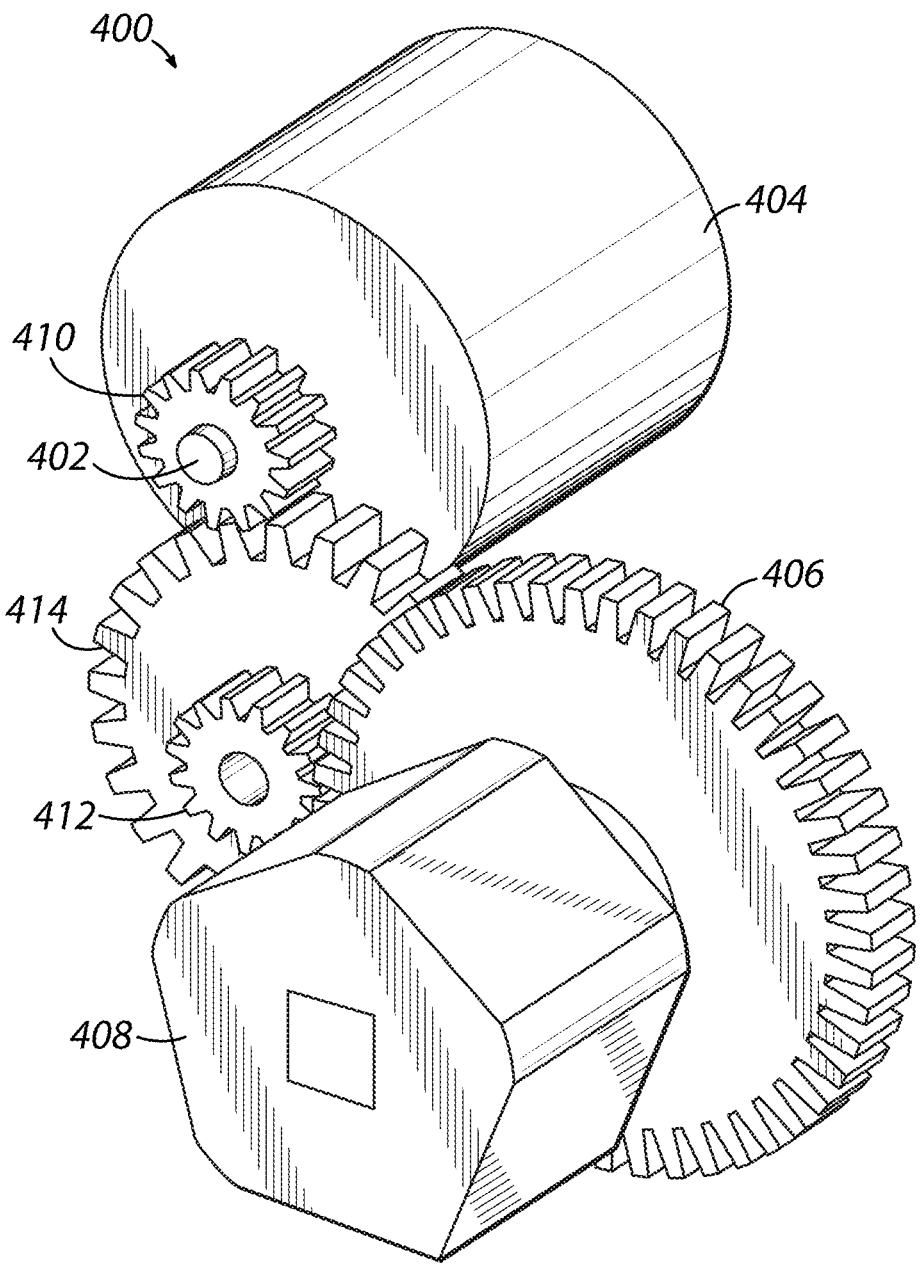
FIG. 6 is a front isometric view of a portion of an illustrative gear train disposed in the housing of the dial ring assembly of FIG. 2.
Figure 7:
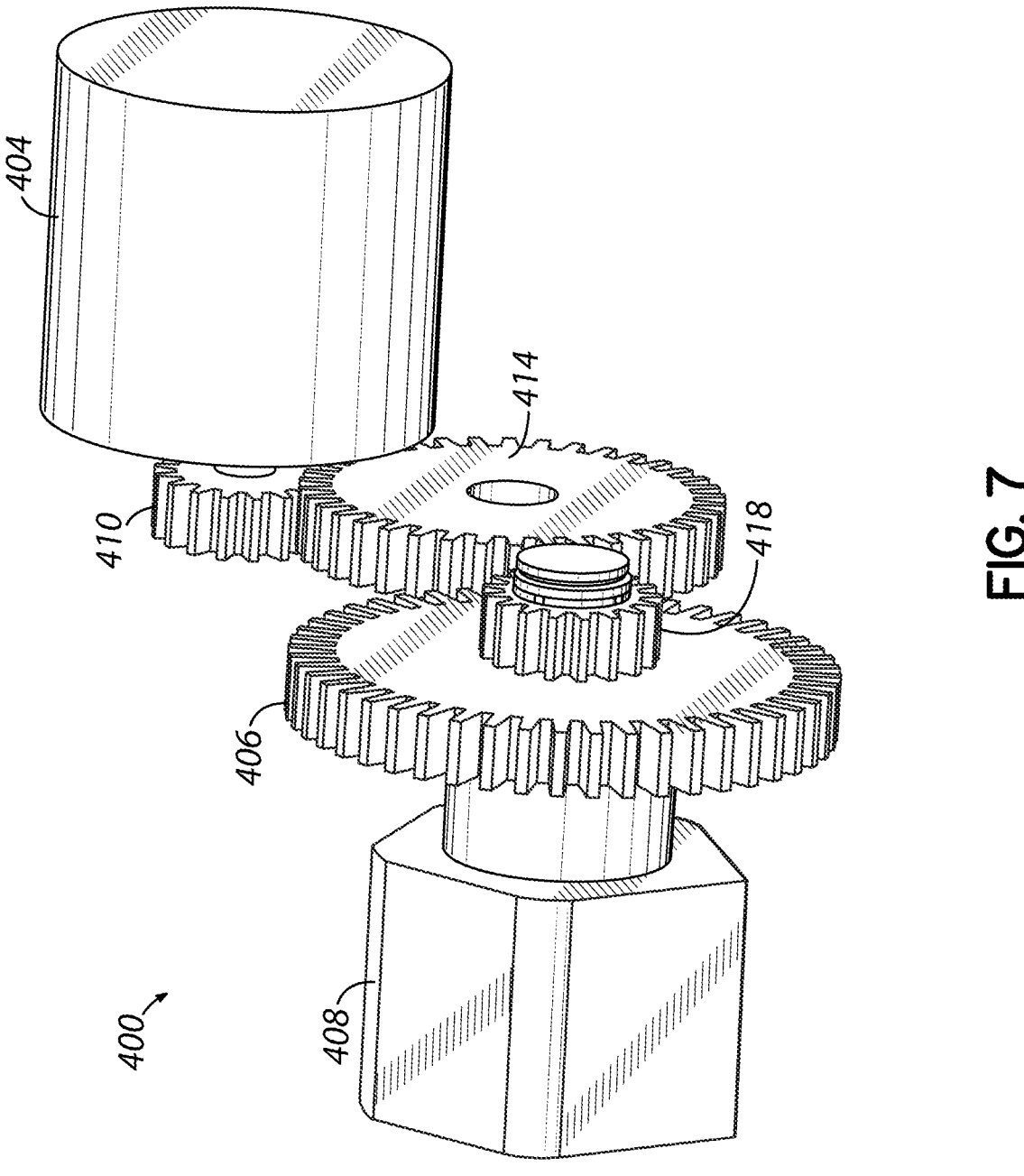
FIG. 7 is a side isometric view of a portion of the illustrative gear train of FIG. 6.
Figure 8:
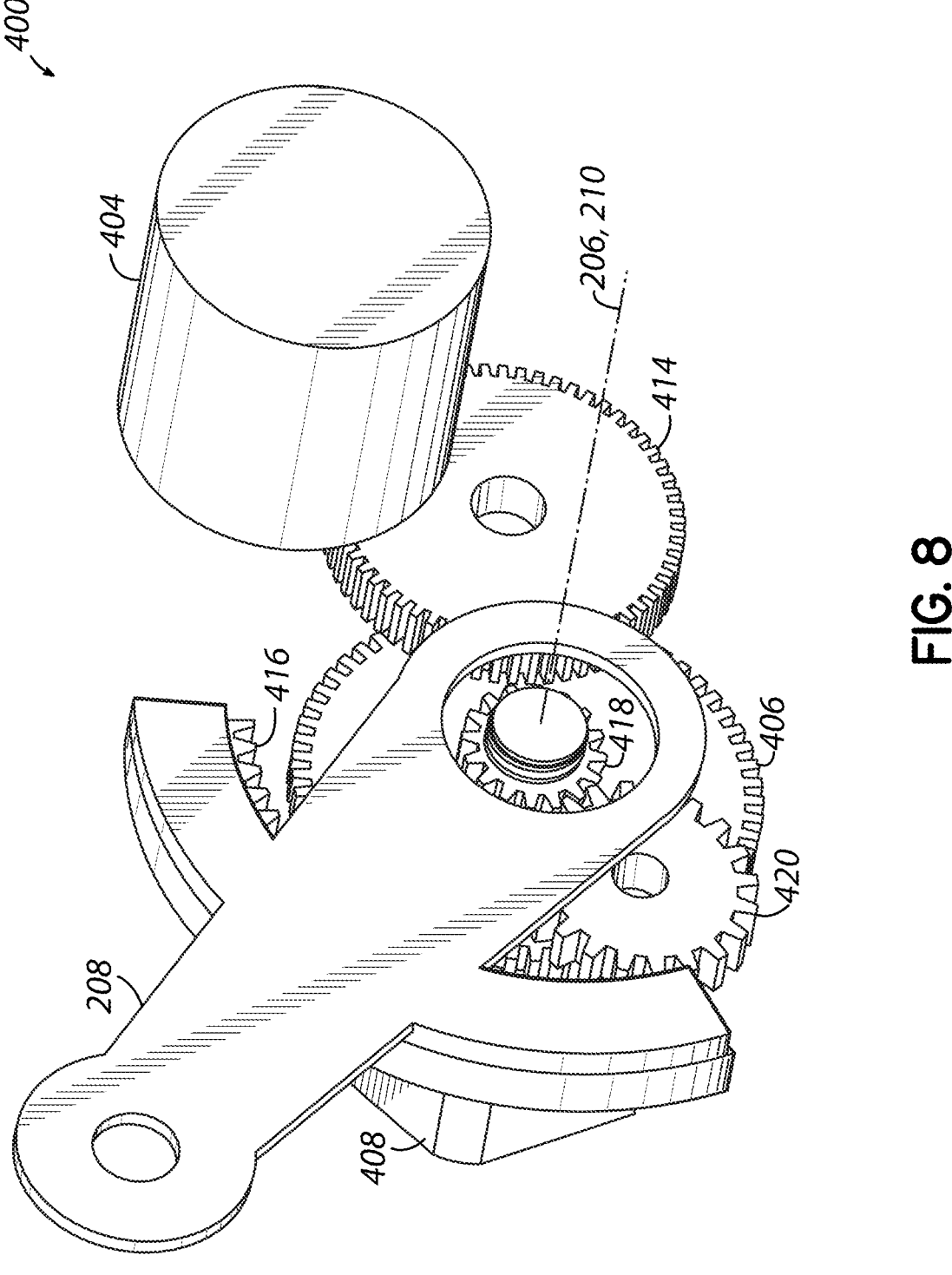
FIG. 8 is a rear isometric view of a portion of the illustrative gear train of FIGS. 6 and 7.

FIG. 6 is a front isometric view of a portion of an illustrative gear train 400 disposed in the housing 202 of the dial ring assembly 200, FIG. 7 is a side isometric view of a portion of the illustrative gear train 400, and FIG. 8 is a rear isometric view of a portion of the illustrative gear train 400, all according to at least some aspects of the present disclosure. Referring to FIGS. 2 and 6-8, the illustrative gear train 400 is configured to rotate an external generator shaft 402 of an external electrical generator 404 disposed in the housing 202 to produce electrical energy when the dial 204 and/or the lever 208 are rotated about their respective axes 206, 210. Additionally, in some exemplary embodiments, the external electrical generator 404 may be utilized in connection with detecting rotation of the dial 204, such as for detecting rotation of the dial 204 in connection with a user entering a combination. For example, the electrical signal from the poles the generator 404 may be used, or a position sensing device, an encoder for example, may be integrated with the generator to provide an electrical signal corresponding to the rotation of the dial 204 by the user.

The illustrative gear train 400 comprises a dial drive gear 406 that is operatively connected to the dial 204 for rotation with the dial 204. In this embodiment, the dial drive gear 406 is coupled for rotation with a hub 408, which is coupled for rotation with the dial 204. For example, the dial drive gear 406 may comprise a spur gear that is integrally formed with the hub 408 or a spur gear that is affixed to the hub 408 for rotation with the hub 408. The illustrative gear train 400 comprises an external generator shaft driven gear 410, such as a spur gear, which is operatively connected to the external generator shaft 402 for rotation with the external generator shaft 402.

The illustrative gear train 400 comprises a pair of coupled gears interposing the dial drive gear 406 and the external generator shaft driven gear 410: a first intermediate gear 412 and a second intermediate gear 414, which are coupled to rotate coaxially together. The first intermediate gear 412 engages and/or is driven by the dial drive gear 406. The second intermediate gear 414 engages and/or drives the external generator shaft driven gear 410. In this illustrative gear train 400, the dial drive gear 406 has a larger diameter than the first intermediate gear 412, and the second intermediate gear 414 has a larger diameter than the external generator shaft driven gear 410. Accordingly, the illustrative gear train 400 operates as a double multiplier gear arrangement between the dial 204 and the external generator shaft 402. In one illustrative embodiment, the gear train 400 provides a gear (e.g., speed) ratio of the dial 204 to the external generator shaft 402 of about 1:13. Thus, rotating the dial 204 about one-half turn rotates the external generator shaft 402 about seven turns. Alternative embodiments may utilize gear trains providing different gear ratios.

Referring to FIGS. 1-4 and 6-8, generally, rotation of the dial 204 rotates the dial drive gear 406, which engages and rotates the first intermediate gear 412, which is coupled to and rotates the second intermediate gear 414, which engages and drives the external generator shaft driven gear 410, which is coupled to and rotates the external generator shaft 402. Accordingly, rotation of the dial 204 rotates the external generator shaft 402 to produce electrical energy.

The illustrative gear train 400 further comprises a gear arrangement configured to cause rotation of the external generator shaft 402 by rotation of the lever 208. The illustrative gear train 400 comprises a lever drive gear 416 operatively connected to the lever 208 for rotation with the lever 208. In this exemplary embodiment, the lever drive gear 416 comprises an internal gear segment of about 120 degrees. In some alternative exemplary embodiments, the internal gear segment may be about 140 degrees or at least about 140 degrees. The illustrative gear train 400 comprises a lever driven gear 418, such as a spur gear, which is operatively connected to the dial drive gear 406 for rotation with the dial drive gear 406, and a lever idler gear 420, such as a spur gear, which interposes the lever drive gear 416 and the lever driven gear 418.

Generally, and as described in more detail below, rotation of the lever 208 causes rotation of the lever drive gear 416, which engages and rotates the lever idler gear 420, which engages and rotates the lever driven gear 418, which is coupled to and rotates the dial drive gear 406. Rotation of the dial drive gear 406 causes rotation of the external generator shaft 402 as described above. Accordingly, rotation of the lever 208 rotates the external generator shaft 402 to produce electrical energy.

Additionally, the lever driven gear 418 is coupled to and rotates with the dial drive gear 406, which is coupled to and rotates with the dial 204, rotation of the lever 208 causes rotation of the dial 204. In one illustrative embodiment, the gear train 400 provides a gear (e.g., speed) ratio of the lever 208 to the dial 204 of about 1:3. Thereby, rotating the lever 208 about 120 degrees rotates the dial 204 about 360 degrees. Further, rotating the lever 208 about 120 degrees rotates the external generator shaft 402 about 13 turns. Alternative embodiments may utilize gear trains providing different gear ratios.

In the illustrative embodiment, it may be relatively easy for a user to apply torque to the lever 208 that is substantially greater than the maximum dialing toque for the dial 204. For example, a user may be able to exert about 3-4 times the maximum dialing torque using the lever 208. Accordingly, in view of the gear ratio of the gear train 400 between the lever 208 and the external generator shaft 402, rotation of the lever 208 may produce substantially more electrical power than a corresponding rotation of the dial 204.

Figure 9:
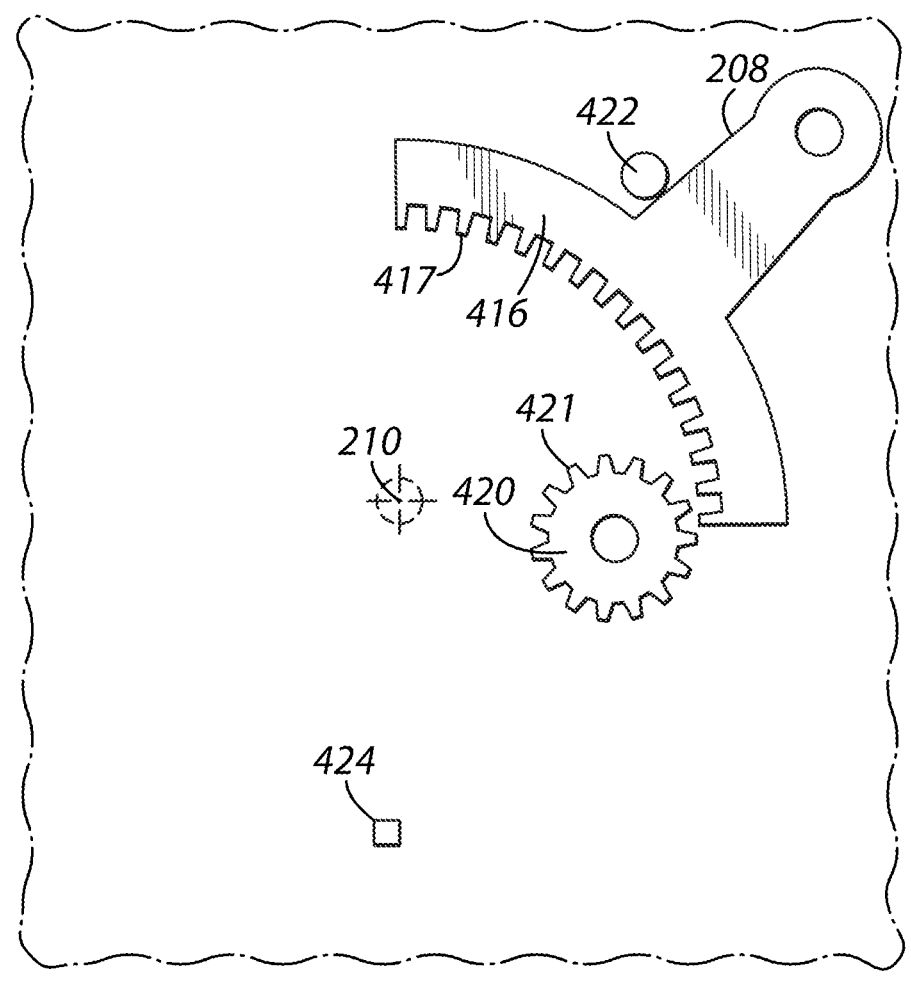
FIG. 9 is a partial front elevation view of a lever drive gear in a rotational position with respect to a lever idler gear.
Figure 10:
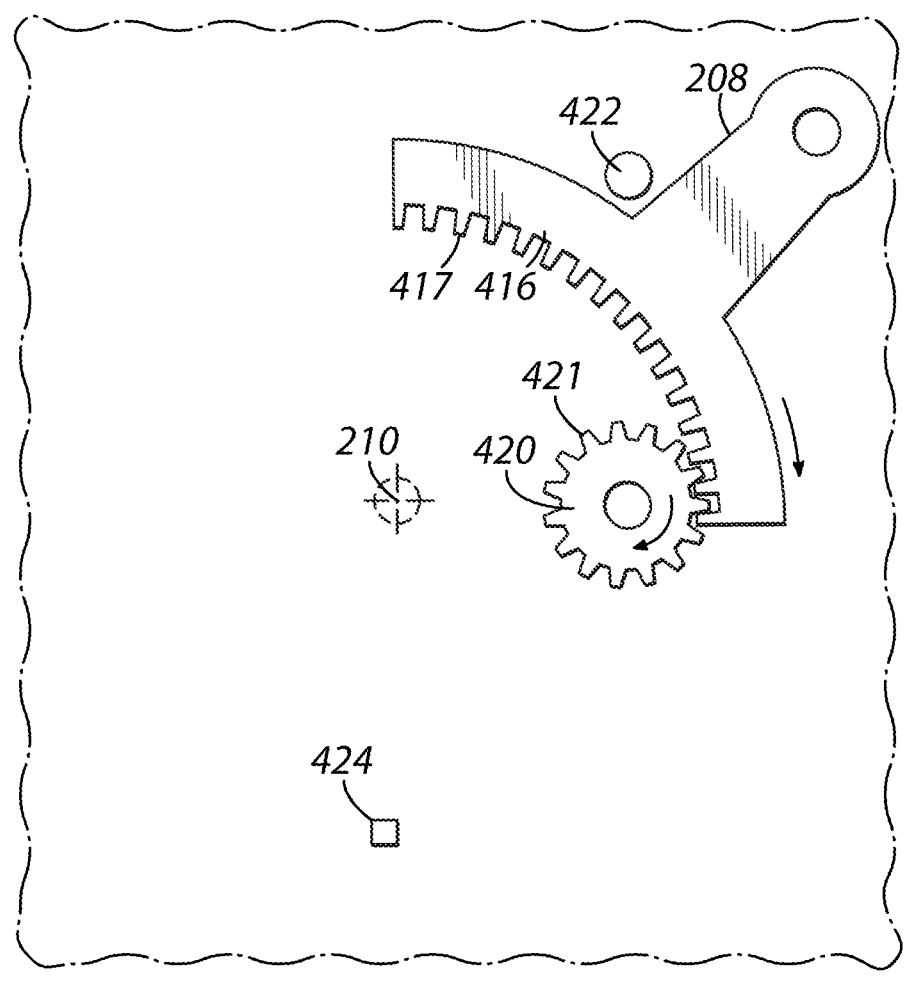
FIG. 10 is a partial front elevation view of the lever drive gear of FIG. 9 in an alternate rotational position with respect to the lever idler gear.
Figure 11:
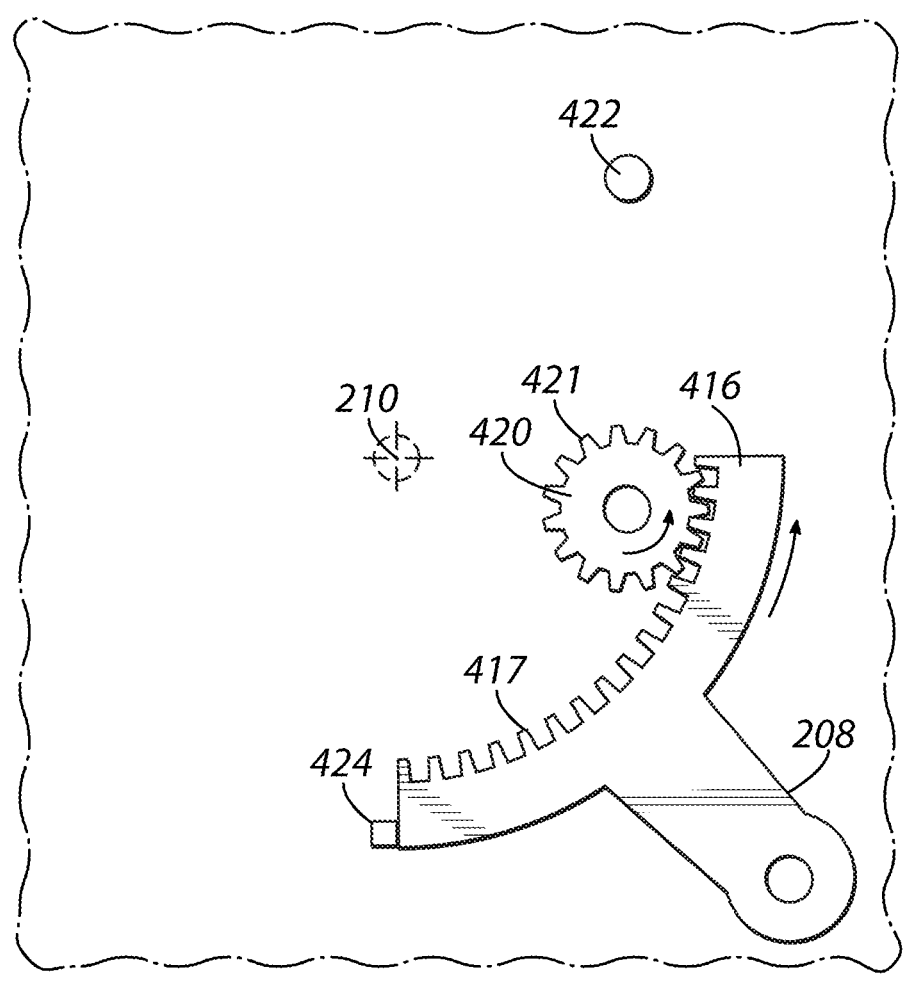
FIG. 11 is a partial front elevation view of the lever drive gear of FIGS. 9 and 10 in an alternate rotational position with respect to the lever idler gear.

FIGS. 9-11 are partial front elevation views of the lever drive gear 416 in different rotational positions with respect to the lever idler gear 420, all according to at least some aspects of the present disclosure. Referring to FIG. 9, the lever 208 is shown in a first, counter-clockwise-most angular position. The lever 208 may be retained in this first angular position, such as by a magnetic catch 422. In this first angular position, the lever drive gear 416 (i.e., the internal gear segment) is disengaged from the lever idler gear 420 and, therefore, the dial drive gear 406. Specifically, in the first angular position, the gear teeth 417 of the lever drive gear 416 are disengaged from the gear teeth 421 of the lever idler gear 420 and the lever drive gear 416 is angularly separated from the idler gear 420. As described above with reference to FIGS. 1-4 and 6-8, the lever driven gear 418 is coupled to the dial drive gear 406 for rotation with the dial drive gear 406, and the lever idler gear 420 engages the lever driven gear 418. Accordingly, rotating the dial 204 also rotates the lever idler gear 420. But, in the first angular position shown in FIG. 9, rotation of the dial 204 does not rotate the lever 208 because the lever drive gear 416 is disengaged from the lever idler gear 420.

Referring to FIG. 10, the lever 208 is shown in a second angular position, which is clockwise relative to the first angular position shown in FIG. 9. In the second angular position, the lever drive gear 416 has begun to engage the lever idler gear 420. Specifically, the second angular position is the angular position of the lever 208, rotating clockwise from the first angular position, at which the lever drive gear 416 initially engages and begins to cause rotation of the lever idler gear 420. In the illustrative embodiment, the angular difference between the first angular position and the second angular position is about 10 degrees.

Because the lever drive gear 416 is disengaged from the lever idler gear 420 when the lever 208 is in the first angular position and when the lever is between the first angular position and the second angular position, rotation of the lever 208 between the first angular position and the second angular position does not cause rotation of the lever idler gear 420 or other components of the gear train 400 (FIGS. 6-8).

Referring to FIG. 11, the lever 208 is shown in a third, clockwise-most angular position, which is clockwise relative to the second angular position shown in FIG. 10. The lever 208 may be prevented from rotating farther in the clockwise direction, such as by a mechanical stop 424. In the illustrative embodiment, the angular difference between the second angular position and the third angular position is about 120 degrees. In alternative embodiments, the lever 208 may be configured for different angles of rotation.

Because the lever drive gear 416 is engaged with the lever idler gear 420 beginning when the lever 208 is in the second angular position, further rotation of the lever 208 in the clockwise direction beyond the second angular position to the third angular position causes rotation of the lever idler gear 420 and, accordingly, rotation of other components of the gear train 400 as described above. Specifically, rotation of the lever 208 in the clockwise direction from the second angular position (FIG. 10) to the third angular position (FIG. 11) causes rotation of the gear train 400 and the external generator shaft 402 (FIG. 6) in one direction, and rotation of the lever 208 in the counter-clockwise direction, such as from the third angular position (FIG. 11) to the second angular position (FIG. 10) causes rotation of the gear train 400 and the external generator shaft 402 (FIG. 6) in the opposite direction. Thus, rotational movement of the lever 208 between the second and third angular positions, regardless of direction, causes rotation of the external generator shaft 402 and production of electrical energy by the generator 404.

As described below, in the illustrative embodiment, the lever 208 is rotated to retract the bolt 102 after the correct combination has been entered, and the lever 208 is rotated to extend the bolt 102 when the enclosure 10 is secured. In some embodiments, rotation of the lever 208 to retract and extend the bolt 102 over the course of one unlocking-locking operation may produce sufficient electrical energy to power the lock 100 for the next unlocking operation. In some embodiments, rotation of the lever 208 to retract and extend the bolt 102 over the course of one unlocking-locking operation may produce sufficient electrical energy to power a system real time clock until the next unlocking operation.

Figure 12:
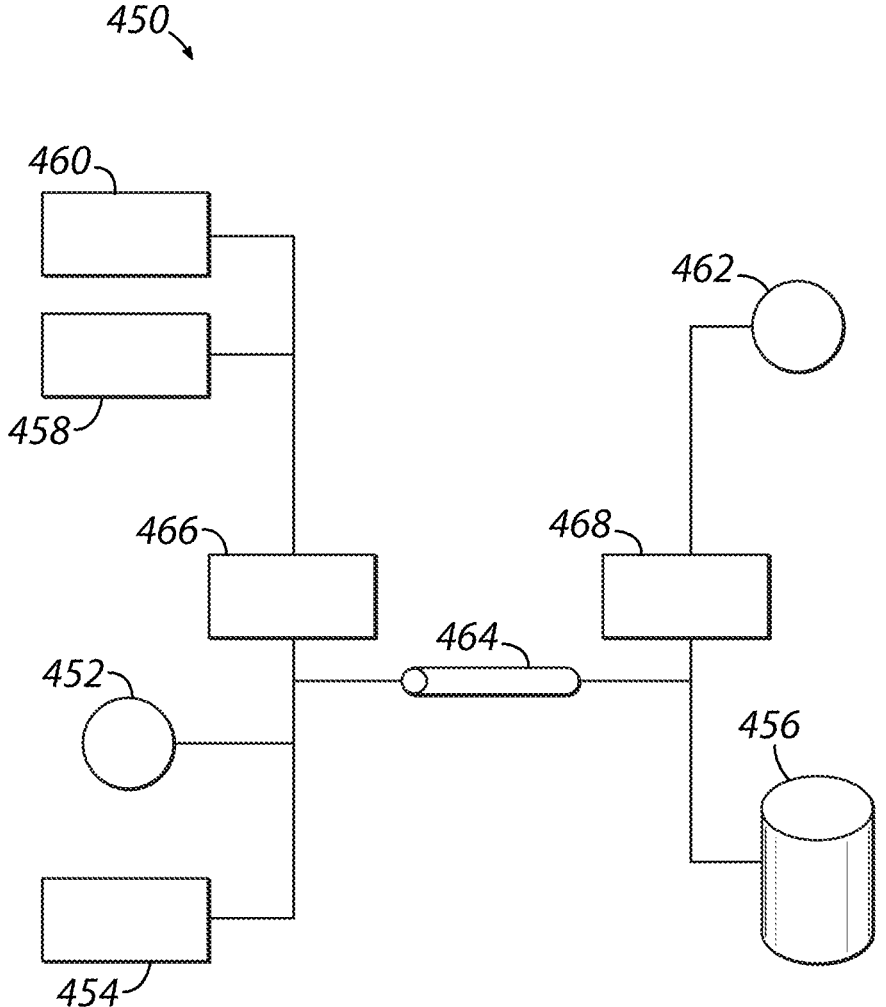
FIG. 12 is a simplified schematic diagram showing an illustrative electrical arrangement for an electromechanical lock.

FIG. 12 is a simplified schematic diagram showing an illustrative electrical arrangement 450 for an electromechanical lock 100 (FIG. 1), according to at least some aspects of the present disclosure. Electrical power sources, such as one or more generators 452 (e.g., generators 236, 404) and/or one or more photovoltaic arrays 454 (e.g., photovoltaic array 218) produce electrical energy, which is stored in one or more electrical energy storage devices 456 (e.g., a capacitor energy storage device, such as a super capacitor). The generator 452 may include, for example, a 3-phase motor generator with each phase coupled to the power bus via a rectifier. In some exemplary embodiments, electrical power may be routed between the interior of the securable enclosure and the exterior of the securable enclosure (and vice versa) via a power tube 464. Electrical energy is provided for use by various components of the lock 100, such as one or more processors 458 (e.g., processors 232, 234), one or more displays 460 (e.g., electronic display 214), and/or one or more components 462 of the lock assembly 300 (e.g., one or more motors and/or solenoids). Electrical energy may be supplied to various loads via one or more regulators, such as low voltage regulators 466, 468. Electrical energy and/or signals may be conducted via a power tube, such as power tube 464, or via any other desired manner such as standard cable, ribbon cable, or other electrical conductor components.

Generally, in the illustrative embodiment, the lever 208 may have two functions. First, the lever 208 is operative to generate electrical power, as the lever 208 is moved up and down. Typically, when an operator approaches the lock he or she will move the lever 208 down and up one time creating the power to operate the lock 100. The operator enters the combination. Assuming the combination is correct "OP" may appear on the display 214 indicating the correct combination has been entered causing the bolt retraction mechanism to activate. As part of the second function, the operator will then move the lever 208 downward to a "down" or lowered position to mechanically retract the lock bolt 102. The lever 208 will remain down as long as the lock 100 is unlocked. To lock the lock 100, the operator will raise the lever 208 to an "up" or raised position, moving the lock bolt 102 to the locked position. With the lever 208 up, the lock 100 is ready for another unlocking cycle. Therefore, another result of the second function of the lever 208 is to give a visual indication of the lock status as "locked" or "unlocked." To an observer (such as a security guard, for example), if the lever 208 is in the up position, the lock 100 is locked and may only be unlocked by entering the combination. However, if the lever 208 is in the down position, the lock 100 may be unlocked, or the lock 100 may be locked and the lever 208 may have been pushed down while the lock 100 was locked in order to generate power, for example. In this situation, the observer (such as the security guard) can more thoroughly check the status of the lock 100 and the secure enclosure or other protected area being secured by the lock 100. If the lever 208 is in the raised or "up" position, the bolt 102 is extended and the secure enclosure or other protected area is secured. When operating the lever 208 to generate electrical power while the lock 100 is locked, the lever 208 may be lowered and raised and the bolt 102 will remain extended and the secure enclosure or other protected area will remain secured.

Figure 13:
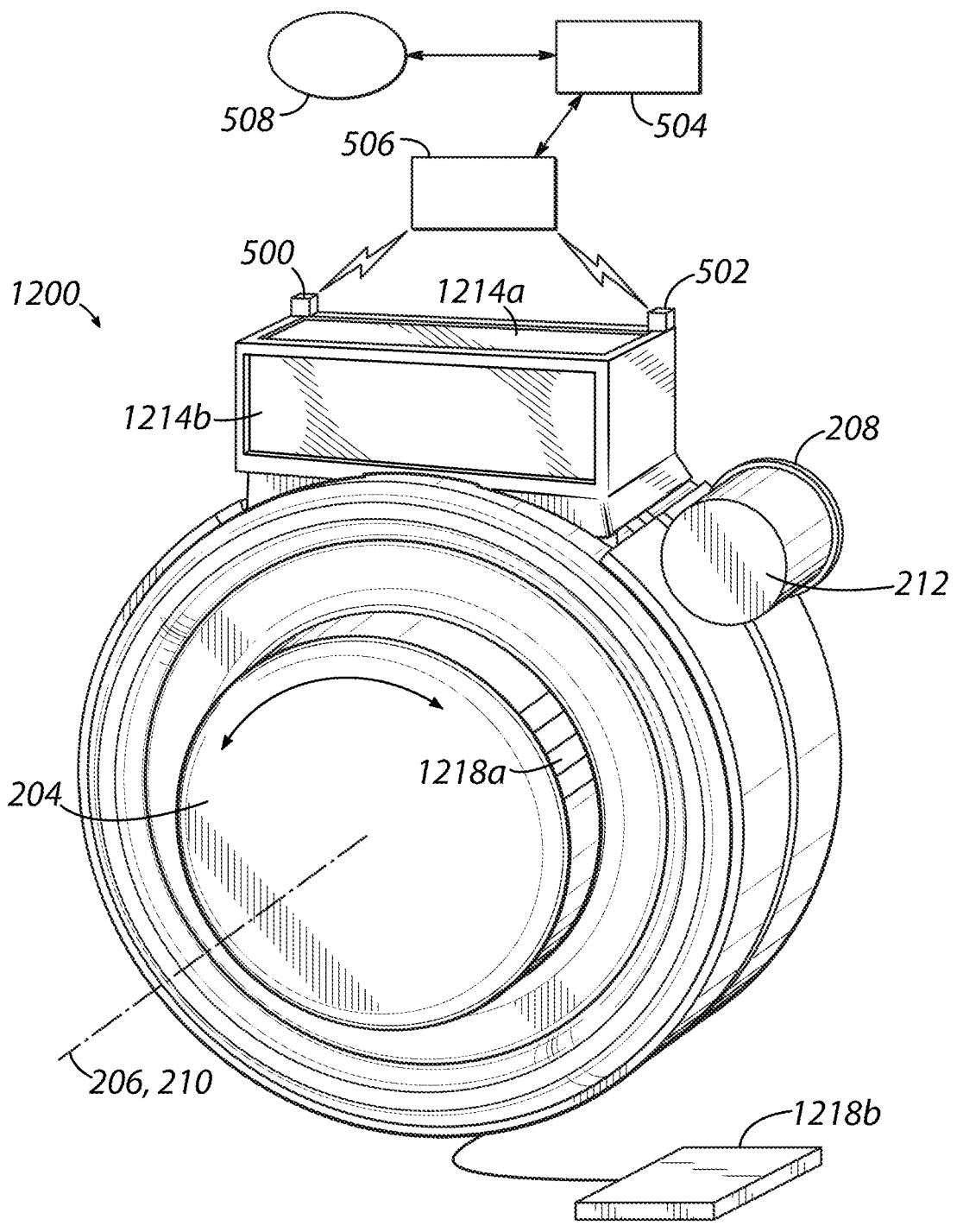
FIG. 13 is an isometric view of an alternative illustrative dial ring assembly.

FIG. 13 is an isometric view of an alternative illustrative dial ring assembly 1200, according to at least some aspects of the present disclosure. The dial ring assembly 1200 includes various alternative and/or optional features. Generally, the dial ring assembly 1200 may be similar in construction and/or operation to the dial ring assembly 200 described above. Unless specifically indicated, the description of the structure and function or methodology of corresponding components with respect to the dial ring assembly 200 generally applies to the dial ring assembly 1200. Generally, the optional and/or alternative features described in connection with the dial ring assembly 1200 may be utilized in connection with other embodiments according to at least some aspects of the present disclosure, including the dial ring assembly 200 described above.

In some embodiments, the display 214 (FIG. 2) may be replaced by a display 1214a oriented substantially parallel to the dial axis 206. Such a display 1214a may face generally upward as shown in FIG. 13, or it may face generally laterally or generally downward, for example. Some alternative exemplary embodiments may include a display 1214b oriented substantially transverse to the dial axis 206.

Some alternative exemplary embodiments may include a dial photovoltaic array 1218a disposed on the dial 204, such as partially or fully circumferentially around the dial 204. Various exemplary embodiments may include one or both of the dial ring photovoltaic array 218 and the dial photovoltaic array 1218a. In embodiments including a dial photovoltaic array 1218a, one or more brushes or other rotatable electrical connectors may be provided between the dial 204 and the housing 202 to allow electrical energy produced by the dial photovoltaic array 1218a to supply various electrical loads in the lock 100 (FIG. 1).

Some embodiments may include a photovoltaic array 1218b, which may be mounted near the lock 100 to provide electrical energy to the lock 100. The photovoltaic array 1218b may be positioned and oriented to receive incident light for producing electrical energy. For example, the photovoltaic array 1218b may comprise a panel attached to the exterior of the enclosure 10, such as the front of the enclosure 10. In some embodiments, the photovoltaic array 1218b may be positioned and/or oriented to receive incident light energy that would not be effectively collected by the dial ring photovoltaic array 218 and/or the dial photovoltaic array 1218a, such as due to the position and/or orientation of the dial ring assembly 1200 on the enclosure 10.

Some exemplary embodiments may include at least one of a transmitter 500 and a receiver 502 configured for communication with a remote station 504. The transmitter 500 and/or the receiver 502, which may be combined into a transceiver, may be configured to communicate wirelessly with a communication unit 506, and the communication unit 506 may be operatively connected to the remote station 504. The remote station 504 may comprise a central monitoring facility, which may be operatively connected to an alarm system 508. For example, the transmitter 500 may comprise an infrared transmitter and the receiver 502 may comprise an infrared receiver. The transmitter 500 and the receiver 502 may be configured to communicate with the communication unit 506 wirelessly using infrared data signals. The communication unit 506 may be disposed near the dial ring assembly 1200, such as on the ceiling of a room containing the securable enclosure 10. The communication unit 506 may be configured to communicate with a plurality of dial ring assemblies 1200, and individual locks may be uniquely identified. The communication unit 506 may be configured to communicate with the remote station 504 using wired and/or wireless data transfer. In some example embodiments, the transmitter 500 may be configured to transmit data associated with various events, such as a locking event, an unlocking event, and/or a lock status report. The data may be transmitted upon the occurrence of an event, at periodic intervals, and/or upon being requested by the communication unit 506 and/or the remote station 504.

Referring again to FIGS. 1-4, generally, the lock 100 may be operated as follows. A user may rotate and/or depress the dial 204 as necessary to enter the combination for the lock 100. If necessary, the user may rotate the dial 204 and/or rotate the lever 208 to produce electrical energy for operation of the lock 100 prior to entering the combination. For example, the user may rotate the lever 208 clockwise and then counter-clockwise to generate power for operating the lock 100, power being generated from the clockwise and counter-clockwise rotation. After the correct combination has been entered, the lock assembly 300 may operatively couple the spindle 224 to the bolt 102 to allow rotation of the lever 208 (e.g., clockwise) to retract the bolt 102. After retracting the bolt 102 and operating other locking devices associated with the enclosure 10 (e.g., boltworks), the door 16 may be opened.

The enclosure 10 may be placed into a secured condition by shutting the door 16 and operating other locking devices associated with the enclosure 10. Then, the user may extend the bolt 102 by rotating the lever 208 in the opposite direction (e.g., counter-clockwise). Once the bolt 102 has been extended and the lever 208 has been returned to the first angular position, the locking mechanism 300 may disconnect the spindle 224 from the bolt 102, thereby securing the bolt 102 in the extended position.

Referring to FIGS. 1-8, a more detailed, illustrative method of operating the illustrative electromechanical combination lock 100 is described. The method may include entering a combination by rotating the dial 204, including producing electrical energy by rotating the external generator shaft 402 of the external generator 404 and/or retracting the bolt 102 extending from the lock assembly 300 by rotating the lever 208 disposed on the dial ring assembly 200 about the lever axis 210, including producing electrical energy by rotating the external generator shaft 402. The method may include viewing at least one indicium 216 associated with the combination on the electronic display 214 disposed on the housing 202. The method may include pushing the switch 205 in a single press. The method may include pushing the switch 205 in a double press to change between at least two modes. The method may include axially displacing the dial 204 along the dial axis 206 in a single press to actuate at least one switch 222a, 222b, 222c, 222d. The method may include axially displacing the dial 204 along the dial axis 206 in a double press to change between at least two modes. The method may include rotating the lever 208 in a first direction to retract the bolt 102 and/or extending the bolt 102 by rotating the lever 208 in a second, opposite direction.

An illustrative method of manufacturing a security device is described. The method includes assembling a dial ring assembly 200, including providing a housing 202; disposing an external generator 404 in the housing 202; rotatably disposing a dial 204 on the housing, rotatably disposing a lever 208 on the housing 202; and disposing a gear train 400 in the housing 202. The method may include locating a switch 205 on the housing. The method may include disposing an electronic display 214 on the housing 202. The method may include disposing a photovoltaic array 218, 1218a on the housing 202, such as disposing the photovoltaic array 218 at least partially circumferentially around the housing 202 and/or disposing the photovoltaic array 1218a at least partially circumferentially around the dial 204. The method may include installing the dial ring assembly 200 on an exterior of a wall 22 or a door 16 of a securable enclosure 10, installing a lock assembly 300 on an interior of the wall 22 or the door 16, and/or operatively connecting the dial ring assembly 200 and the lock assembly 300 through the wall 22 or the door 16. The method may include installing a photovoltaic array 1218b comprising a photovoltaic panel on the securable enclosure 10 and/or operatively connecting the photovoltaic array 1218b to the dial ring assembly 200.

An illustrative method of installing the illustrative lock 100 is described. The method includes mounting the dial ring assembly 200 on an exterior of a wall 22 or a door 16 of the securable enclosure 10. The method may include mounting the lock assembly 300 on an interior of the wall 22 or the door 16 and/or operatively connecting the dial ring assembly 200 and the lock assembly 300 through the wall 22 or the door 16. The method may include connecting the spindle 224 to the dial ring assembly 200 and the lock assembly 300. The method may include installing the power tube 228 comprising at least one conductor 226 electrically connecting the dial ring assembly 200 and the lock assembly 300. The method may include installing the photovoltaic array 1218b comprising a photovoltaic panel on the securable enclosure 10 and/or operatively connecting the photovoltaic array 1218b to the dial ring assembly 200.

Some example locks according to at least some aspects of the present disclosure may be configured for operation in two or more modes. For example, some locks may be configured to facilitate both a single-user mode and a multi-user mode. In some circumstances, it may be desirable to limit which users may change the mode of operation of a multi-mode lock. Similarly, in some circumstances, it may be desirable to limit which users may activate audit trail functions and/or other operations. Accordingly, some locks may be configured to provide different capabilities to different users of the lock. For example, one level of capability may allow a user to change the combination, but not change other aspects of the operation of the lock. A second, higher level of capability may allow a user to change modes of operation, clear an audit trail, etc. In some embodiments, such different levels of capabilities may be facilitated by use of different change keys recognizable by the lock as being associated with different users with different levels of capabilities. In some embodiments, changing the mode of operation of a lock may require access to the interior of the securable enclosure. In some embodiments, some mode changes may require insertion of a change key, while other mode changes may require insertion of a change key and entry of a special, mode-change combination. In some embodiments, some mode changes may require a first special combination and other mode changes may require a second special combination. In alternative or additional aspects, the electronic display may be configured to display at least one indicium associated modes of operation. The display may include audible or other perceptible indicum associated with modes of operation.

As described above, some embodiments may be configured to utilize both alphabetic and numeric characters in combinations. The number of possible combinations for a three character alpha numeric combination is 2,000,376. Using a four character alpha numeric combination would yield a potential of 252,047,502 combinations. With that number of available combinations, a lock may accommodate at least ten users, each having a unique combination. In some embodiments, each user may be identified by a unique code, such as an alpha numeric code or other unique identifier, although this option may not be desired especially if each authorized user is instead given their own unique combination code for opening the lock.

Some embodiments may include an audit function. For example, an audit function package may allow security personnel to review both authorized lockings and unlockings, as well as unsuccessful attempts, each with date and time. In some embodiments, this functionality may be added to an existing lock with little, if any, modification to the lock. The audit function may utilize the real time clock described above. Access to read (e.g., extract) audit information may only be from inside the secured area.

Some locks may be configured for operation in connection with an external identification device, such as a biometric reader and/or a card reader. For example, the external device may act as a pre-approval for operation of the lock 100. If an authorized biometric reading is obtained and/or an authorized card is presented, the lock may operate as described above. If the external device does not signal the lock that an authorized identification (e.g., biometric and/or card) is present, the lock may not power up and/or the display may not turn on, thus making operation (e.g., opening) of the lock impossible.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A dial ring assembly for an electromechanical combination lock, the dial ring assembly comprising:
   a housing configured to be mounted on an exterior of a securable enclosure;
   a dial rotatably disposed on the housing, the dial being rotatable about a dial axis for use in connection with entry of a combination;
   a lever rotatably disposed on the housing, the lever being rotatable about a lever axis;
   an external generator disposed in the housing, the external generator being configured to generate electrical energy through rotation of an external generator shaft of the external generator; and
   a gear train disposed in the housing and operatively connecting the dial, the lever, and the external generator shaft such that rotation of the dial rotates the external generator shaft to produce electrical energy and rotation of the lever clockwise and counter-clockwise rotates the external generator shaft to produce electrical energy.

2. The dial ring assembly of claim 1,
wherein the gear train comprises
  a dial drive gear operatively connected to the dial for rotation with the dial, and
  an external generator shaft driven gear operatively connected to the external generator shaft for rotation with the external generator shaft.

3. The dial ring assembly of claim 2,
wherein the gear train comprises
  a lever drive gear operatively connected to the lever for rotation with the lever, and
  a lever driven gear operatively connected to the dial drive gear for rotation with the dial drive gear.

4. The dial ring assembly of claim 3, wherein the lever drive gear comprises an internal gear segment.

5. The dial ring assembly of claim 1,
further comprising a rotatable spindle configured to be operatively connected to a lock assembly mounted on an interior of the securable enclosure;
wherein the spindle is coupled to the lever for rotation with the lever.

6. The dial ring assembly of claim 5, wherein the spindle is positioned coaxially with the lever axis and is rotatable about the lever axis.

7. The dial ring assembly of claim 5,
wherein rotation of the lever and the spindle is selectively operative to extend and retract a bolt;
wherein, when the bolt is in an extended position, the securable enclosure is in a secured condition.

8. The dial ring assembly of claim 1, further comprising an electronic display disposed on the housing, the electronic display being configured to display at least one indicium associated with entry of the combination.

9. The dial ring assembly of claim 8,
wherein the display is substantially planar; and
wherein the display is oriented substantially transversely to the dial axis.

10. The dial ring assembly of claim 8,
wherein the display is substantially planar; and
wherein the display is oriented substantially parallel to the dial axis.

11. The dial ring assembly of claim 8, wherein the display is repositionable between at least two angular display orientations relative to the dial axis.

12. The dial ring assembly of claim 1, comprising at least one of a transmitter and a receiver configured for communication with a remote station.

13. The dial ring assembly of claim 12,
wherein at least one of the transmitter and the receiver is configured to communicate wirelessly with a communication unit; and
wherein the communication unit is operatively connected to the remote station.

14. The dial ring assembly of claim 12,
wherein the transmitter comprises an infrared transmitter; and
wherein the receiver comprises an infrared receiver.

15. The dial ring assembly of claim 12, wherein the transmitter is configured to transmit data associated with at least one of a locking event, an unlocking event, and a status report.

16. The dial ring assembly of claim 1, further comprising a photovoltaic array configured to produce electrical energy.

17. The dial ring assembly of claim 16, wherein the photovoltaic array is disposed at least partially circumferentially on the housing.

18. The dial ring assembly of claim 16, wherein the photovoltaic array is disposed at least partially circumferentially around the dial.

19. The dial ring assembly of claim 1, wherein the dial is axially displaceable along the dial axis.

20. The dial ring assembly of claim 1, further comprising an external processor disposed in the housing.

21. The dial ring assembly of claim 20, wherein the external processor is configured to monitor rotation of the dial.

22. The dial ring assembly of claim 20, wherein the external processor is configured to communicate with an internal processor disposed within an interior of the securable enclosure.

23. The dial ring assembly of claim 22, wherein the external processor is configured to communicate with the internal processor using encrypted infrared data.

24. The dial ring assembly of claim 1, further comprising a switch disposed on the housing.

25. An electromechanical combination lock, comprising:
the dial ring assembly of claim 1; and
a lock assembly comprising a bolt, the bolt being selectively extendable and retractable.

26. A securable enclosure, comprising:
a plurality of walls at least partially defining an interior;
an access component arranged to selectively close an opening though the plurality of walls; and
the electromechanical combination lock of claim 25 disposed on one of the door or one of the plurality of walls;
wherein the electromechanical combination lock is configured to secure the door in a closed position.

27. A dial ring assembly for an electromechanical combination lock, the dial ring assembly comprising:
a housing configured to be mounted on an exterior of a securable enclosure;
a dial rotatably disposed on the housing, the dial being rotatable about a dial axis for use in connection with entry of a combination;
a lever rotatably disposed on the housing, the lever being rotatable about a lever axis;
an external generator disposed in the housing, the external generator being configured to generate electrical energy through rotation of an external generator shaft of the external generator; and
a gear train disposed in the housing and operatively connecting the dial, the lever, and the external generator shaft such that rotation of the dial rotates the external generator shaft to produce electrical energy and rotation of the lever rotates the external generator shaft to produce electrical energy;
wherein rotation of the dial rotates the external generator shaft; and
wherein rotation of the lever rotates the dial and the external generator shaft.

28. A dial ring assembly for an electromechanical combination lock, the dial ring assembly comprising:
a housing configured to be mounted on an exterior of a securable enclosure;
a dial rotatably disposed on the housing, the dial being rotatable about a dial axis for use in connection with entry of a combination;
a lever rotatably disposed on the housing, the lever being rotatable about a lever axis;

an external generator disposed in the housing, the external generator being configured to generate electrical energy through rotation of an external generator shaft of the external generator; and a gear train disposed in the housing and operatively connecting the dial, the lever, and the external generator shaft such that rotation of the dial rotates the external generator shaft to produce electrical energy and rotation of the lever rotates the external generator shaft to produce electrical energy;

wherein the gear train comprises a dial drive gear operatively connected to the dial for rotation with the dial, and an external generator shaft driven gear operatively connected to the external generator shaft for rotation with the external generator shaft; and wherein the gear train comprises a first intermediate gear coupled to rotate coaxially with a second intermediate gear, the first intermediate gear engaging the dial drive gear and the second intermediate gear engaging the external generator shaft driven gear.

29. A dial ring assembly for an electromechanical combination lock, the dial ring assembly comprising:

a housing configured to be mounted on an exterior of a securable enclosure;

a dial rotatably disposed on the housing, the dial being rotatable about a dial axis for use in connection with entry of a combination;

a lever rotatably disposed on the housing, the lever being rotatable about a lever axis;

an external generator disposed in the housing, the external generator being configured to generate electrical energy through rotation of an external generator shaft of the external generator; and a gear train disposed in the housing and operatively connecting the dial, the lever, and the external generator shaft such that rotation of the dial rotates the external generator shaft to produce electrical energy and rotation of the lever rotates the external generator shaft to produce electrical energy;

wherein the gear train comprises a dial drive gear operatively connected to the dial for rotation with the dial, and an external generator shaft driven gear operatively connected to the external generator shaft for rotation with the external generator shaft, wherein the gear train comprises a lever drive gear operatively connected to the lever for rotation with the lever, and a lever driven gear operatively connected to the dial drive gear for rotation with the dial drive gear; and wherein the gear train comprises a lever idler gear interposing the lever drive gear and the lever driven gear.

30. A dial ring assembly for an electromechanical combination lock, the dial ring assembly comprising:

a housing configured to be mounted on an exterior of a securable enclosure;

a dial rotatably disposed on the housing, the dial being rotatable about a dial axis for use in connection with entry of a combination;

a lever rotatably disposed on the housing, the lever being rotatable about a lever axis;

an external generator disposed in the housing, the external generator being configured to generate electrical energy through rotation of an external generator shaft of the external generator; and a gear train disposed in the housing and operatively connecting the dial, the lever, and the external generator shaft such that rotation of the dial rotates the external generator shaft to produce electrical energy and rotation of the lever rotates the external generator shaft to produce electrical energy;

wherein the gear train comprises a dial drive gear operatively connected to the dial for rotation with the dial, and an external generator shaft driven gear operatively connected to the external generator shaft for rotation with the external generator shaft;

wherein the gear train comprises a lever drive gear operatively connected to the lever for rotation with the lever, and a lever driven gear operatively connected to the dial drive gear for rotation with the dial drive gear;

wherein the lever is rotatable about the lever axis between a first angular position, a second angular position, and a third angular position;

wherein, in the first angular position, the lever drive gear is disengaged from the dial drive gear; and wherein, in the second angular position, in the third angular position, and between the second angular position and the third angular position, the lever drive gear is operatively connected to the dial drive gear such that rotation of the lever between the second angular position and the third angular position rotates the external generator shaft.

31. The dial ring assembly of claim 30, wherein rotation of the lever between the first angular position and the second angular position does not rotate the external generator shaft.

32. A dial ring assembly for an electromechanical combination lock, the dial ring assembly comprising:

a housing configured to be mounted on an exterior of a securable enclosure;

a dial rotatably disposed on the housing, the dial being rotatable about a dial axis for use in connection with entry of a combination;

a lever rotatably disposed on the housing, the lever being rotatable about a lever axis;

an external generator disposed in the housing, the external generator being configured to generate electrical energy through rotation of an external generator shaft of the external generator;

a gear train disposed in the housing and operatively connecting the dial, the lever, and the external generator shaft such that rotation of the dial rotates the external generator shaft to produce electrical energy and rotation of the lever rotates the external generator shaft to produce electrical energy; and a rotatable spindle configured to be operatively connected to a lock assembly mounted on an interior of the securable enclosure;

wherein the spindle is coupled to the lever for rotation with the lever;

wherein rotation of the lever and the spindle is selectively operative to extend and retract a bolt;

wherein, when the bolt is in an extended position, the securable enclosure is in a secured condition;

wherein the lever is movable between a first position in which the bolt is extended and a second position in which the bolt is retracted; and the position of the lever is therefore visually indicative of the status of the securable enclosure being secured or unsecured.

33. A dial ring assembly for an electromechanical combination lock, the dial ring assembly comprising:

a housing configured to be mounted on an exterior of a securable enclosure;

a dial rotatably disposed on the housing, the dial being rotatable about a dial axis for use in connection with entry of a combination;

a lever rotatably disposed on the housing, the lever being rotatable about a lever axis;

an external generator disposed in the housing, the external generator being configured to generate electrical energy through rotation of an external generator shaft of the external generator; and a gear train disposed in the housing and operatively connecting the dial, the lever, and the external generator shaft such that rotation of the dial rotates the external generator shaft to produce electrical energy and rotation of the lever rotates the external generator shaft to produce electrical energy;

wherein the dial is axially displaceable along the dial axis;

wherein the dial is biased axially outward; and wherein the dial is configured such that pressing the dial axially inward actuates at least one switch.

34. A method of manufacturing a security device, comprising:

providing a housing configured to be mounted on an exterior of a securable enclosure;

disposing an external generator in the housing, the external generator being configured to generate electrical energy through rotation of an external generator shaft of the external generator;

rotatably disposing a dial on the housing, the dial being rotatable about a dial axis for use in connection with entry of a combination;

rotatably disposing a lever on the housing, the lever being rotatable about a lever axis; and disposing a gear train in the housing, the gear train operatively connecting the dial, the lever, and the external generator shaft such that rotation of the dial rotates the external generator shaft to produce electrical energy and rotation of the lever clockwise and counterclockwise rotates the external generator shaft to produce electrical energy.

35. The method of claim 34, further comprising disposing an electronic display on the housing, the electronic display being configured to display at least one indicium associated with entry of the combination.

36. The method of claim 34, further comprising disposing a photovoltaic array on the dial ring assembly.

37. The method of claim 36, wherein disposing the photovoltaic array on the dial ring assembly comprises disposing the photovoltaic array at least partially circumferentially around the housing.

38. The method of claim 36, wherein disposing the photovoltaic array on the dial ring assembly comprises disposing the photovoltaic array at least partially circumferentially around the dial.

39. The method of claim 34, further comprising installing the dial ring assembly on an exterior of one of a wall and a door of a securable enclosure; and installing a lock assembly on an interior of one of the wall and the door, including operatively connecting the dial ring assembly and the lock assembly through one of the wall and the door.

40. The method of claim 39, further comprising installing a photovoltaic array on the securable enclosure, including operatively connecting the photovoltaic array to the dial ring assembly, the photovoltaic array comprising a photovoltaic panel.

41. A dial ring assembly for an electromechanical combination lock, the dial ring assembly comprising:

a housing configured to be mounted on an exterior of a securable enclosure;

a dial rotatably disposed on the housing, the dial being rotatable about a dial axis for use in connection with entry of a combination;

an electronic display disposed on the housing, the electronic display being configured to display at least one indicium associated with entry of the combination;

wherein the display is repositionable between at least two angular display orientations relative to the dial axis;

a lever rotatably disposed on the housing, the lever being rotatable about a lever axis;

an external generator disposed in the housing, the external generator being configured to generate electrical energy through rotation of an external generator shaft of the external generator; and a gear train operatively connecting the dial, the lever, and the external generator shaft such that rotation of the dial rotates the external generator shaft to produce electrical energy and rotation of the lever rotates the external generator shaft to produce electrical energy;

wherein the lever is rotatable about the lever axis between a first angular position, a second angular position, and a third angular position;

wherein, in the first angular position, the lever is disengaged from the external generator shaft; and wherein, in the second angular position, in the third angular position, and between the second angular position and the third angular position, the lever is operatively connected to the external generator shaft such that rotation of the lever between the second angular position and the third angular position rotates the external generator shaft.

* * * * *